United States Patent
Munro et al.

(10) Patent No.: US 12,032,728 B2
(45) Date of Patent: Jul. 9, 2024

(54) MACHINE INTERACTION

(71) Applicant: Soul Machines Limited, Auckland (NZ)

(72) Inventors: Robert Jason Munro, Auckland (NZ); Shane Allan Blackett, Auckland (NZ); Mark Andrew Sagar, Auckland (NZ)

(73) Assignee: SOUL MACHINES LIMITED, Auckland (NZ)

( * ) Notice: Subject to any disclaimer, the term of this patent is extended or adjusted under 35 U.S.C. 154(b) by 701 days.

(21) Appl. No.: 16/973,419

(22) PCT Filed: Jul. 19, 2019

(86) PCT No.: PCT/NZ2019/050083
§ 371 (c)(1),
(2) Date: Dec. 8, 2020

(87) PCT Pub. No.: WO2020/017981
PCT Pub. Date: Jan. 23, 2020

(65) Prior Publication Data
US 2021/0216349 A1      Jul. 15, 2021

(30) Foreign Application Priority Data

Jul. 19, 2018 (NZ) ....................... 744410
Jul. 3, 2019 (NZ) ....................... 755122

(51) Int. Cl.
*G06F 3/01* (2006.01)
*G06F 9/455* (2018.01)

(52) U.S. Cl.
CPC .... *G06F 3/011* (2013.01); *G06F 2009/45562* (2013.01)

(58) Field of Classification Search
CPC .................. G06F 3/011; G06F 9/453
See application file for complete search history.

(56) References Cited

U.S. PATENT DOCUMENTS

| 6,570,555 | B1 | 5/2003 | Prevost et al. |
| 7,426,467 | B2 | 9/2008 | Nashida et al. |
| 8,136,038 | B2 * | 3/2012 | Ross .................. G06F 3/04815 715/706 |

(Continued)

FOREIGN PATENT DOCUMENTS

| EP | 1 444 687 B1 | 8/2008 |
| EP | 2 610 724 A1 | 7/2013 |

(Continued)

OTHER PUBLICATIONS

International Search Report in PCT International Application No. PCT/NZ2019/050083, mailed Nov. 13, 2019.

(Continued)

*Primary Examiner* — Ryan F Pitaro
(74) *Attorney, Agent, or Firm* — MARSHALL, GERSTEIN & BORUN LLP

(57) ABSTRACT

Interaction with a Computer is provided via an autonomous virtual embodied Agent. The Computer outputs Digital Content, which includes any content that exists in the form of digital data and is representable to a User. A subset of, or all, Digital Content is configured as Shared Digital Content which is representable to both the User and to the Agent.

17 Claims, 13 Drawing Sheets

(56) References Cited

U.S. PATENT DOCUMENTS

| | | | |
|---|---|---|---|
| 8,850,315 B1* | 9/2014 | Rogers | G06F 16/9577 715/767 |
| 10,719,660 B1* | 7/2020 | Howard | G06F 3/04817 |
| 11,200,742 B1* | 12/2021 | Post | G06T 19/003 |
| 11,270,672 B1* | 3/2022 | Lee | G06F 3/017 |
| 11,393,198 B1* | 7/2022 | Little | G06F 3/013 |
| 11,418,357 B2* | 8/2022 | Howland | H04L 12/1822 |
| 2001/0043233 A1* | 11/2001 | Sato | G06F 9/451 715/706 |
| 2010/0169837 A1 | 7/2010 | Hyndman | |
| 2013/0051547 A1* | 2/2013 | Chavez | G06Q 10/103 379/265.09 |
| 2013/0339902 A1* | 12/2013 | Katzman | G09B 29/003 715/810 |
| 2014/0222746 A1 | 8/2014 | Gobert et al. | |
| 2015/0302536 A1* | 10/2015 | Wahl | G06Q 50/00 705/2 |
| 2016/0055843 A1 | 2/2016 | Gupta | |
| 2016/0300387 A1 | 10/2016 | Ziman et al. | |
| 2017/0084189 A1* | 3/2017 | Rubalcaba | G09B 7/04 |
| 2018/0121997 A1 | 5/2018 | O'Brien et al. | |
| 2019/0026132 A1* | 1/2019 | King | G06F 3/0487 |
| 2019/0026936 A1* | 1/2019 | Gorur Sheshagiri | G06F 3/04842 |
| 2019/0332400 A1* | 10/2019 | Spoor | G06F 3/013 |
| 2021/0120206 A1* | 4/2021 | Liu | G10L 15/1822 |
| 2021/0248371 A1* | 8/2021 | Carter | G06T 11/00 |
| 2021/0358188 A1* | 11/2021 | Lebaredian | G06T 13/00 |
| 2022/0366689 A1* | 11/2022 | Little | G06Q 40/08 |
| 2023/0298242 A1* | 9/2023 | Djuric | H04W 4/029 345/419 |
| 2024/0053861 A1* | 2/2024 | Little | G06T 19/003 |

FOREIGN PATENT DOCUMENTS

| | | |
|---|---|---|
| KR | 10-2011-0006465 A | 1/2011 |
| WO | 00/05639 A2 | 2/2000 |
| WO | 2015/016723 A1 | 2/2015 |

OTHER PUBLICATIONS

Sagar, M., Seymour, M., & Henderson, A. (2016). Creating connection with autonomous facial animation. Communications of the ACM, 59(12), 82-91.

* cited by examiner

MACHINE INTERACTION

CROSS-REFERENCE TO RELATED APPLICATIONS

This application is a 35 U.S.C. § 371 national stage application of PCT International Application No. PCT/NZ2019/050083, filed on Jul. 19, 2019, which claims the benefit of New Zealand Application Nos. 744410, filed Jul. 19, 2018 and 755122, filed Jul. 3, 2019, which are hereby incorporated by reference in their entirety.

TECHNICAL FIELD

Computer science techniques are employed to facilitate interaction between humans and machines, more particularly, but not exclusively, using embodied agents to facilitate human-computer interaction.

BACKGROUND ART

Human-Computer Interaction (HCI) is a field of computer science directed to improving the interaction between humans and computers, using techniques from computer graphics, operating systems, software programming, and cognitive science. Autonomous Agents can improve human-computer interaction by assisting human users in operating a computer. As Autonomous Agents are capable of flexible and/or autonomous actions in an environment (which may be virtual or real), an Autonomous Interface Agent can be viewed as a robot whose sensors and effectors interact with input and output capabilities of a computer interface. Autonomous Interface Agents may interact with a computer interface in parallel with a user, with or without user instructions or collaboration.

EP1444687B1 titled "Method for managing mixed-initiative human-machine dialogues based on interactive speech" discloses a method of managing mixed-initiative human-machine dialogues based on speech interaction. EP2610724A1 titled "System and method for online user assistance" discloses the display of a virtual animated character for online user assistance.

It may be desirable that Autonomous Interface Agents employ artificial intelligence techniques to process information intelligently and interact and present themselves in a more human-like manner. Human users may find it easier, quicker and/or more engaging to interact with computers using human-like methods of communication, including body language and vocal tone. Secondly, increasing the realism of Agent actions and responses may reduce perceived technology barriers such as the uncanny valley effect.

OBJECTS OF THE INVENTION

It is an object of the present invention to improve human-machine interaction (human-computer interaction) or to at least provide the public or industry with a useful choice.

DETAILED DESCRIPTION

Figure 1:
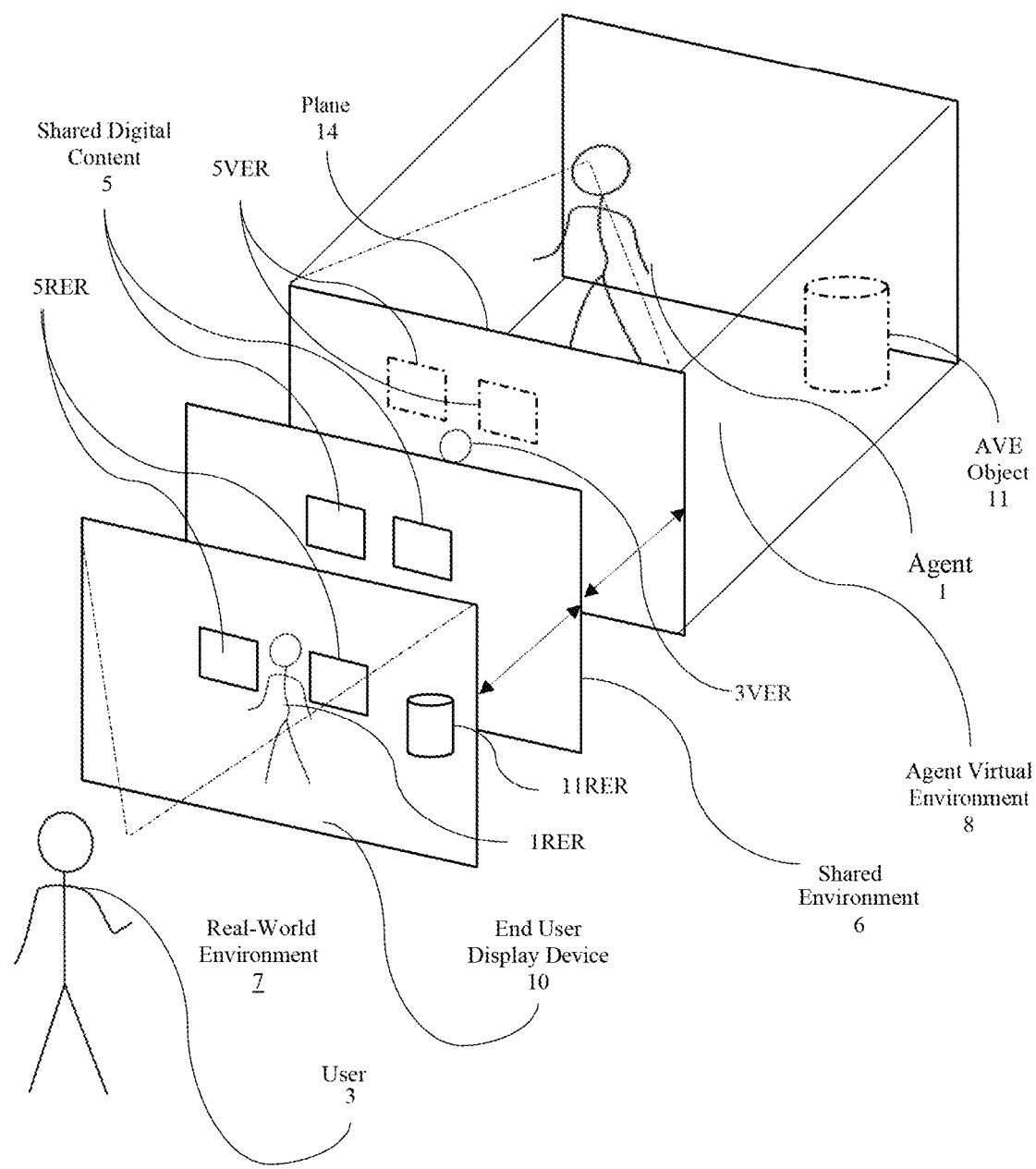
FIG. 1 shows user agent interaction on a shared interaction environment.

Interaction with a Computer is provided via an autonomous virtual embodied Agent (henceforth "Agent"). The Computer outputs Digital Content, which includes any content that exists in the form of digital data and is representable to a User. A subset of, or all, Digital Content is configured as Shared Digital Content which is representable to both the User and to the Agent. FIG. 1 shows a User 3 and an Agent 1 perceiving Shared Digital Content 5. Shared Digital Content 5 can be manipulated and/or perceived (interacted with) by both the User 3 and the Agent 1. A Shared Environment 6 includes all Shared Digital Content 5, and is perceivable by both the Agent 1 and the User 3. The Agent 1 can "physically" (using its embodiment) interact with Shared Digital Content 5 within its Agent Virtual Environment 8.

The Agent 1 is in an Agent Virtual Environment 8 and perceives its Agent Virtual Environment 8. Shared Digital Content 5 is represented to the Agent 1 within the Agent Virtual Environment 8 (AVE). A Plane 14 of the Agent Virtual Environment 8 maps with the area on a computer screen (End User Display Device 10). The Agent Virtual Environment 8 may optionally include AVE Objects 11 that the Agent 1 can interact with. Unlike Shared Digital Content 5, the User 3 is not able to directly interact with AVE Objects, but AVE Objects are represented to the User 3 as part of the Agent 1's environment in the condensed view displayed to the User 3 as shown by 11RER. The Agent 1 can move about its Agent Virtual Environment 8 and interact with digital objects and AVE Objects within the context of physical laws of the Agent Virtual Environment 8. For example, the Agent 1 may pull Shared Digital Content 5 downwards and walk to and sit on the AVE Object 11 (a virtual stool). The Agent 1 may also see a representation of the User 3 (3VER) and Real-World Environment 7, superimposed with and/or simultaneously with the Shared Digital Content 5, as if the Agent 1 is "inside" the screen and looking out into the real world.

The User 3 is a human User 3 in a Real-World Environment 7 and sees and controls (interacts with) what is represented on an End User Display Device 10 (a real-world display such as a screen) from the Computer. The End User Display Device 10 displays a Real-World Environment Representation (RER) of Shared Digital Content SRER (e.g. from a webpage via a browser) and a condensed, superimposed and/or blended view of the Agent 1's environment (AVE) including:

- a Real-World Environment Representation (1RER) of the Agent 1
- a Real-World Environment Representation (11RER) of AVE Object 11

When a User 3 makes a change to Shared Digital Content 5 via a user interface, that change is reflected on the representations of Shared Digital Content 5 in the Agent 1's Agent Virtual Environment 8. Likewise, when an Agent 1 makes a change to objects (items/components of Shared Digital Content 5) in the Agent Virtual Environment 8, the change is mirrored on the representations of Shared Digital Content 5 on the User 3's screen 10.

Figure 2:
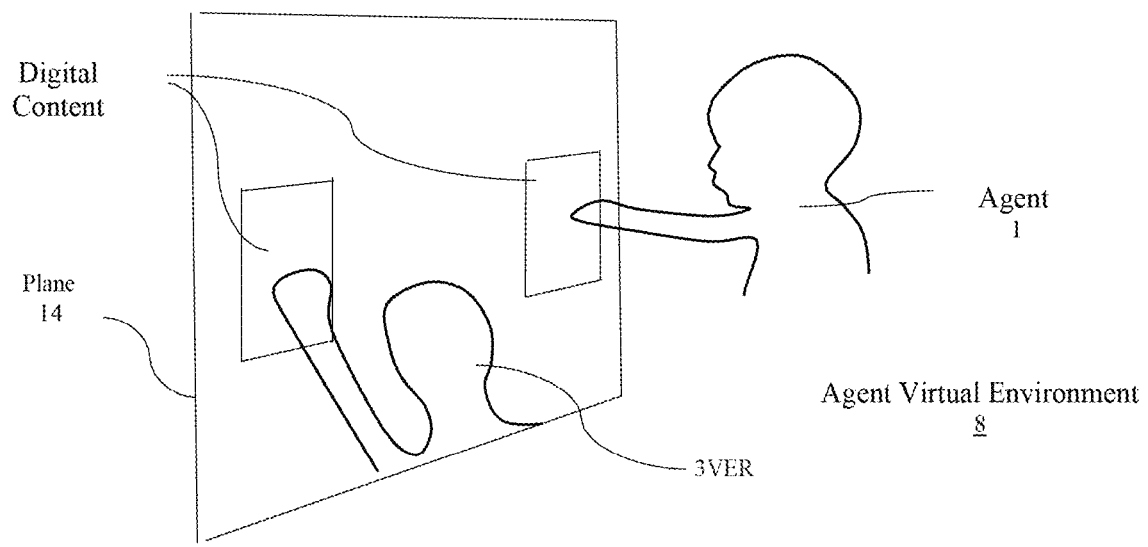
FIG. 2 shows user agent interaction from the perspective of an agent.

It is possible to visualize the Agent and its environment in different ways on an End User Display Device. For example, by rotating the virtual space of the Agent, a 2D plane can be shown from the perspective of the Agent. FIG. 2 shows User-Agent interaction from the perspective of an Agent 1. The Agent 1 is simulated within a three-dimensional Agent Virtual Environment 8. Shared Digital Content 5 is situated within the Agent Virtual Environment 8, relatively in-front of the Agent 1 from the perspective of the User. The Agent 1 perceives a virtual-environment representation of the User 3VER (for example, via a camera feed), which may optionally also be simulated as a plane or otherwise in the Agent Virtual Environment 8 or superimposed/blended with the Shared Digital Content 5 plane. The Agent 1 can thus perceive the relative location of digital content to the User and ascertain if the User is looking at the Shared Digital Content 5. The Agent 1 is shown extending its hand to touch the Shared Digital Content 5.

Figure 4:
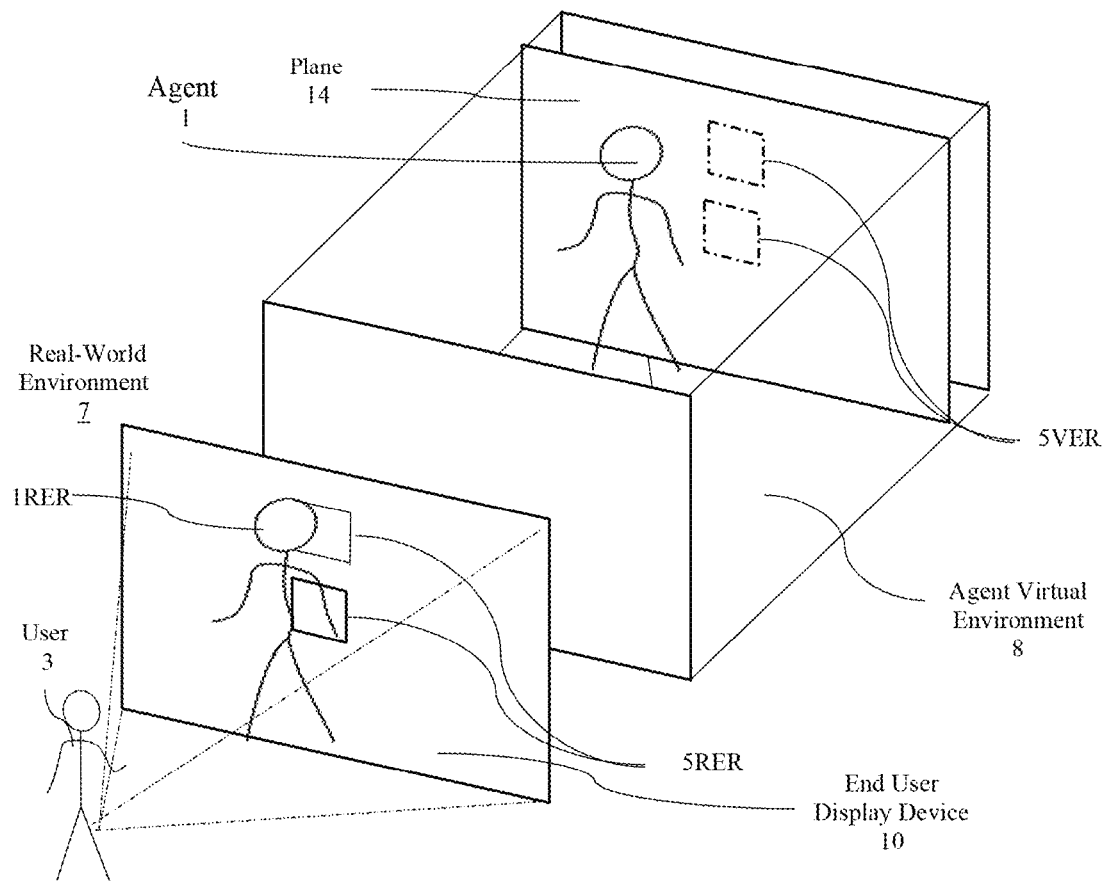
FIG. 4 shows user agent interaction with digital content behind the agent.

The Plane 14 may be located anywhere in the Agent Virtual Environment 8. FIG. 4 shows the Agent 1 facing towards the User 3 and the Plane 14 containing Shared Digital Content 5 (objects) behind the Agent 1. A representation of the Agent 1 may be shown in front of the Real-World Environment Representation (RER) of Shared Digital Content SRER. The User 3 sees a representation of the Agent 1 interacting with Shared Digital Content 5 as if the Agent 1 is in front of the screen.

Figure 3:
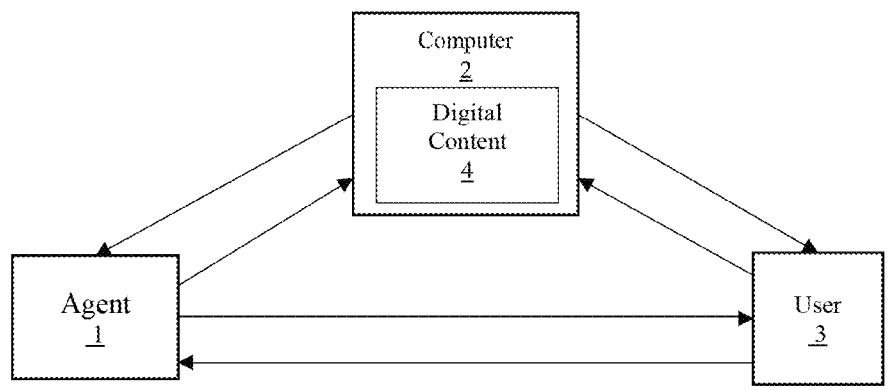
FIG. 3 shows a schematic diagram of human-computer interaction.

FIG. 3 shows a schematic diagram of human-computer interaction wherein an Agent 1, facilitates interaction between a User 3 and Digital Content 4. The User 3 may directly interact with the Digital Content 4 from the Computer 2, by providing input to the Computer 2 via any suitable human input devices/primary input devices and/or interface devices and receiving output from the Computer 2 from any suitable human output devices such as a display or speakers. The Agent 1 can similarly provide input to and receive output from the Computer 2.

Providing the Agent with perception of objects outside its simulation environment is analogous to providing the Agent with "augmented reality", as it provides the Agent with real-time representations of the current state of real-world elements and a Computer, and blending representations of digital content items from a Computer, real-world elements, in a unified view of its world. As a virtual world is enhanced with real-world objects, this may be more accurately defined as augmented virtuality, augmenting autonomous Agent vision as opposed to human vision.

Agent Autonomous Interaction With Digital & Real-World Input

The Agent may include cognitive, situated, embodied, conversational and dynamical aspects. The Agent is embodied, meaning it has a virtual body which the Agent is able to articulate. The Agent's body is represented graphically on a screen or other display. The Agent may be simulated using a neurobehavioral model (biologically modelled "brain" or nervous system), comprising a plurality of modules having coupled computational and graphical elements. Each module represents a biological process and includes a computational element relating to and simulating the biological process and a graphical element visualizing the biological process. Thus, the Agent is "self-animated" as no external control is required and exhibits naturally occurring automatic behaviour such as breathing, blinking, looking around, yawning, moving its lips. Biologically based autonomous animation may be achieved by modelling multiple aspects of the nervous system, including, but not limited to, the sensory and motor systems, reflexes, perception, emotion and modulatory systems, attention, learning and memory, rewards, decision making, and goals. The Agent's face mirrors both the Agent's brain and the body, revealing mental state (such its mental attention via its eye direction) and physiological state (such as fatigue through the position of eyelids and colour of the skin). The use of a neurobehavioral model to animate a virtual object or digital entity is further disclosed in: Sagar, M., Seymour, M., & Henderson, A. (2016). Creating connection with autonomous facial animation. *Communications of the ACM,* 59 (12), 82-91 and WO2015016723A1, also assigned to the assignee of the present invention and is incorporated by reference herein. A time-stepping mechanism as described in WO2015016723A1 may synchronize or coordinate the internal processes of the Agent.

Figure 7:
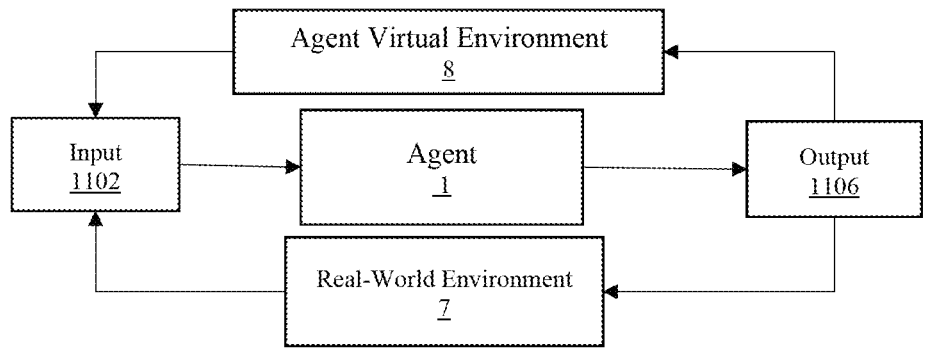
FIG. 7 shows a flow diagram of a feedback loop between the agent and environment.

Aspects of the Agent may be dynamical, meaning the Agent's future behaviour depends upon its current internal state. The Agent's nervous system, body and its environment/s are coupled dynamical systems. Complex behaviour can be generated with or without external input. Complex behaviour can be generated without recourse to any internal representation of the Agent's external environment. The elements of the Agent's surroundings (such as visual stimulus from a User or content items) may form part of the causal network that leads to behaviour production. Agent behaviour and therefore animation can emerge from the bottom up. The Agent's dynamics may be chaotic, making it difficult to predict the behaviour of the Agent in a given situation. The Agent's actions are dependent on a continuous feedback loop from both the Real-World Environment 7 and the Agent Virtual Environment 8 as shown in FIG. 7. The Agent 1 is thus situated in both environments as it receives input 1102 from the Real-World Environment 7, such as audio input from a User and the User's environment (Real-World Environment 7) such as via a microphone, and visual input from a User via a camera. Real world input 1102 to the Agent 1 simulation affects the behaviour of the Agent 1 which results in Agent 1 behaviour which is shown in the Agent 1 animation output 1106. E.g. The Agent 1 may smile when it sees a human User via an indirect mechanism in that recognizing a User releases virtual neurotransmitters such as dopamine within the neurobehavioral model which may naturally trigger smiling in the Agent 1. This output 1106 may in turn affect the Real-World Environment 7, for example by inducing a response or emotion in a User in the Real-World Environment 7, which again is input for the Agent 1 simulation. The Agent 1's Agent Virtual Environment 8 is also input 1102 for the Agent 1. For example, Shared Digital Content items within the Agent Virtual Environment are perceivable by the Agent 1 in real-time as a stream, and affect the behaviour of the Agent 1 which also results in certain Agent 1 animation output 1106. This output 1106 may affect the Agent Virtual Environment 8. For example, the Agent 1 may change the position of a virtual object within the Agent Virtual Environment 8. The new object position is now input 1102 for the Agent 1 simulation driving the continuous feedback loop.

The Agent may be simulated and/or represented in any suitable manner, with any suitable form such as: a human form, a fictitious human form, an anthropomorphic character, a robot, an animal Users being able to choose or change the form them agent takes, or the agent may change its form depending on the user or real or virtual environment.

Movement to Coordinate Locations

Situating the Agent in an Agent Virtual Environment 8 allows "on-the-fly" animation that looks natural and allows Agents to freely interact with the surrounding digital content items (Shared Digital Content 5) as if they exist in the Agent 1's environment. This is distinct from pre-generated or pre-recorded animation snippets, which disadvantageously are difficult to use in interactions with unpredictable or dynamic content. An example of the limitations of pre-recorded animations is use of a simulated arm to reach a certain content item at a position (X, Y). The animation would be functionally restricted in consideration of exactly where the content item is positioned; if the content item moves or changes size, the animation would not be able to change accordingly.

The Agent may be animated using an "on-the-fly" animation algorithm. In a embodied Agent, an effector (e.g. hand) reaching an end goal location (digital object coordinates) is achieved by computing the vector of the joint degrees of freedom that cause the end effector to reach the goal state. Computational techniques such as inverse kinematics may be used to animate the Agent 1. Inverse kinematics may be approximated using known techniques such as Jacobian or Cyclic Coordinate Descent (CCD). A neural network may be trained to map body positions to represent reaching or pointing to an object in two or three-dimensional coordinate space (i.e. learn hand-eye coordination). In one example, a movement-success predictor uses a deep convolutional neural network (CNN) to determine how likely a given motion is to successfully reach designated coordinates and a continuous serving mechanism that uses the CNN to continuously update the Agent's motor commands.

Virtual Environment

The Agent is situated in the Agent Virtual Environment and can perceive objects and the relative locations of objects to the Agent in the Agent Virtual Environment. In most embodiments described herein the Agent is located in a three-dimensional Agent Virtual Environment. In one embodiment, the Agent Virtual Environment is a 2D virtual space represented by a 2D pixel array. A 2D Agent may sit within a 2D virtual space and interact with Shared Digital Content on that 2D space, which can be displaced from the Agent horizontally (left or right) and/or vertically (up or down).

In FIG. 1 the Agent 1 located in a 3D space behind a Plane 14 (screen) reflecting the Shared Environment. The Agent 1 sees Shared Digital Content on the Plane 14 which is at an outer boundary/face of the Agent Virtual Environment 8 (which is a rectangular prism). FIG. 2 shows an Agent 1 touching a content item which is directly in front of the Agent 1. FIG. 4 shows an Agent 1 located in front of the Plane 14 where the Shared Environment digital content items on the screen are positioned. Content items/objects which are Shared Digital Content may be displaced from the Agent 1 in three dimensions, horizontally (left, right, in-front or behind) and/or vertically (up or down) relative to the Agent 1.

Coordinates of the Plane 14 of the Virtual 3D space may be mapped to a browser (or other display) coordinates. Thus, when Agent 1 movements in relation to Shared Digital Content are superimposed onto a screen, the movements align with the digital content item positions.

The real-world coordinates of the display on which the Agent is displayed may change. For example, an Agent displayed on a browser may be moved or resized for example by a User dragging/resizing the browser. The real-world physical dimensions of the display are dynamically changeable and changing the physical dimensions of the display in the Real-World Environment updates the representation of the Agent Virtual Environment proportionally.

The Agent Virtual Environment may be simulated by any suitable mechanism and may follow certain laws of nature. Physical properties of the Agent Virtual Environment may be defined such as: Collision detection between objects and/or the Agent, Physical constraints (for example, movements allowed between joints of objects), Simulation of atmospheric drag, Momentum, Gravity, Material properties (for example, elastic items may return to a natural shape after being stretched by Agents).

Input that Agent Receives

The Agent receives any suitable visual input from the real world (such as a video stream from a camera), depth sensing information from cameras with range-imaging capabilities, such as the Microsoft Kinect camera, audial input such as from a microphone, input from a bio sensor, heat sensor or any other suitable input device, touch-screen input (where a User is pressing a screen). A single input may be provided to the Agent or a combination of inputs may be provided. The Agent may spatially place aspects of the real-world in relation to itself and User may bring the Agent's attention to an object such as a thing or a person in the User's real world space.

The Agent may receive input/communication from the User via a computing device. The Agent may perceive content items such as a User's cursor/mouse or touch screen input (which is also input from the real-world in a way). The Agent may be able to follow the mouse movement of a User with their eyes and/or hands. In some embodiments, the Agent may be able to perceive keyboard input. For example, the User may communicate with the Agent via keyboard rather than verbally.

Visual (e.g. video stream) input is provided to the Agent's visual system. Routines from suitable interfaces may be used for hardware interfacing. This may be provided via an interface between the programmatic definition of the Agent and the camera and/or pixel streamer. This interface is provided by a vision module, which provides a module wrapper to capture image data from the camera at every time-step of the Agent. The vision module may not perform any perceptual processing of the image data (akin to a human "retina").

The Agent may provide output to the real world through output devices of a computing system such as visual output on a display, audible output through speakers, or any other suitable means. The Agent may also output mouse movements, keyboard strokes or other interface interactions, such as clicks or presses.

The Agent may have two or more visual systems, allowing the Agent to simultaneously receive visual input from different sources without needing to overlay different visual sources onto one another. For example, the Agent may have two vision modules, one for camera input, and one for User interface input, and see both simultaneously. Different salience maps may be applied to each input source. For example, salience maps prioritizing faces may operate on the visual system configured to receive real-world input such as camera input, whereas salience maps prioritizing recognition of text and/or recognition of UI elements may be applied to the visual system configured to receive UI input.

Digital Content

Shared Digital Content relating to a website may include web forms, buttons, text, text boxes, text fields, video elements or images. In mixed reality applications, such as augmented reality, virtual reality, holograms, a digital content item could refer to a 3D object. In an application (such as a VR/mobile/computer application), the digital content item could be an object defined by an object-oriented language.

Figure 15:
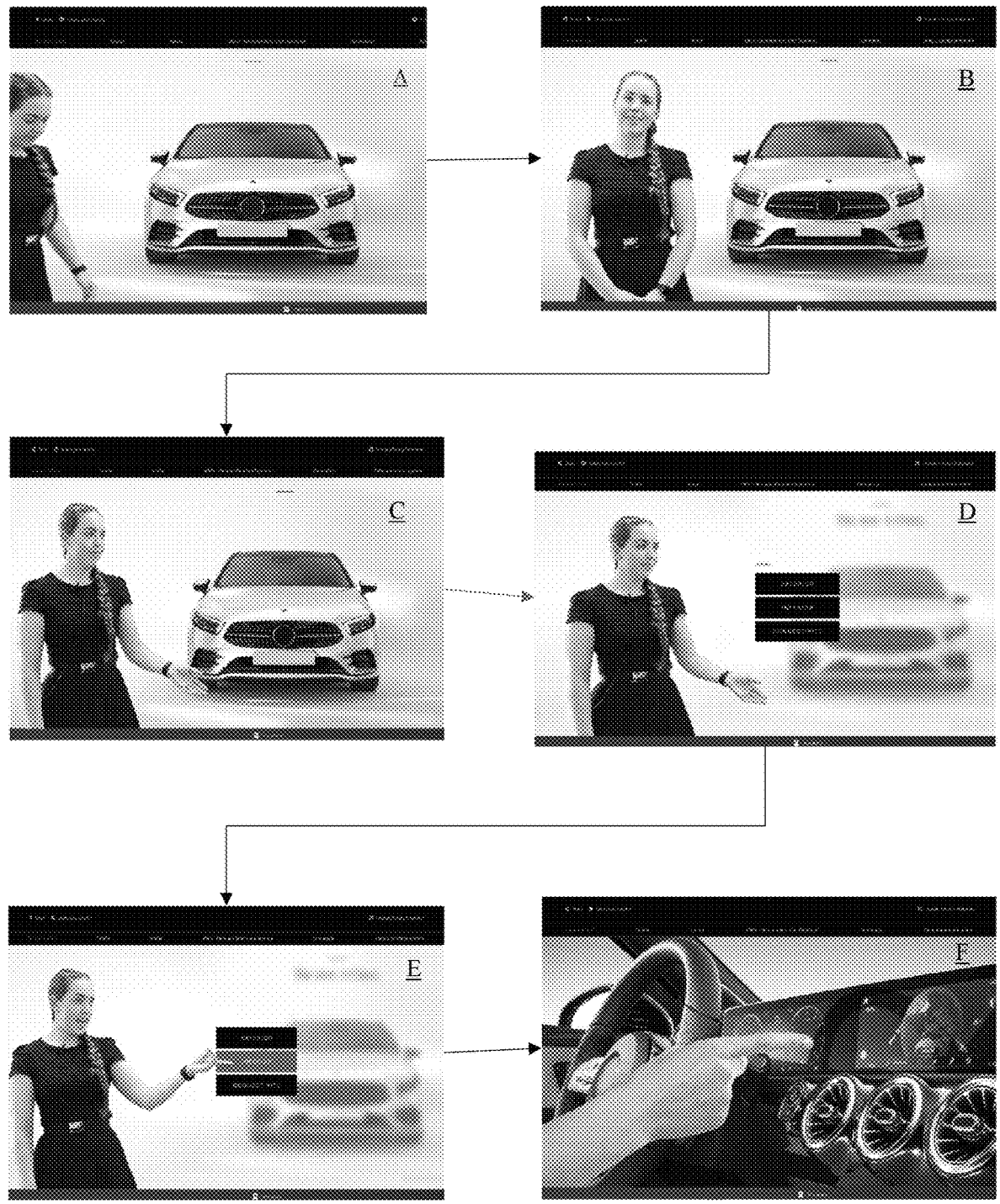

The Digital Content may be dynamic (for example, items of Digital Content may move about a screen), and the Agent may follow or guide the movement of such dynamic content items. Digital content items may be static or interactive. Static content items may be text or images. For example, an Agent engaged with academic tutoring of a User may interact with text by pointing at a certain word displayed to the User, and asking the User if the User understands the meaning of the word. Interactive digital content items may respond to the User and/or Agent's actions in some manner. For example, a button is a digital content item which presents other content when clicked. Digital content items may be represented in two dimensions or in three dimensions. For example, FIG. 15 shows a car object, modelled in 3D and situated within the Agent Virtual Environment.

Since the Agent is embodied in a virtual space along with content items, the Agent may interact with Shared Digital Content in several different ways in a flexible and scalable manner, using gestures, looking at items, approaching items, manipulating or handling items or invoking methods associated with items. The Agent may:
  tilt its body towards the item and/or tilt its head towards the item.
  look at an item with its eyes.
  gesture towards an item by pointing toward an item, bobbing its head in the general direction of an item, or waving in the direction of the item.
  approach an item by walking towards it or teleporting or floating to location proximate to the item.

Enabling Agent Interaction With Shared Digital Content

Embodied Agents are programmatically defined independently from digital content with which they interact: There is no central controller controlling both the digital content and the embodied Agents. This allows embodied Agents to be used flexibly with digital content authored by distinct third-party providers. Two mechanisms which may enable Agents to perceive and natively interact with novel digital content include Computer Vision, and an Interaction Module (support interface):

Computer Vision

In one embodiment, the Agent receives input in the form of visual data from a source representing a display to a User. For example, the Agent sees pixels of a screen or 3D virtual space via a visual (virtual) image and/or object recognition. The Agent may be equipped with visual object recognition such as by standard computer vision/image processing/image recognition/machine learning techniques, to identify objects/subjects in the image or video or objects, the contours/colours of the subject of the image or video and interact with it accordingly. The Agent may be equipped with optical character recognition to recognize text and with natural language processing to understand text. In other words, Digital Content is visually represented to an Agent in the same manner in which it is represented to human Users (visual display of pixels). The Agent system may include inbuilt image recognition and/or learning, or it may use a third party service for image recognition.

Digital Content Input

A visual representation of a Shared Environment may be sent to an Agent in a manner analogous to how a screen sharing software sends a visual representation of a screen to a remote location. An interface may be configured to send packets of information from a computing device to the Agent describing what is being output by the computing device at any given time. Data may arrive as image files (e.g. JPEGs and GIFs), or data may arrive as individual pixels assigned to a particular X and Y coordinate (and Z in the case of mixed reality). To minimize the amount of bandwidth, the interface may be configured to only send information updates on the sections of the screen that have changed and/or to compress the data that is sent.

Figure 17:
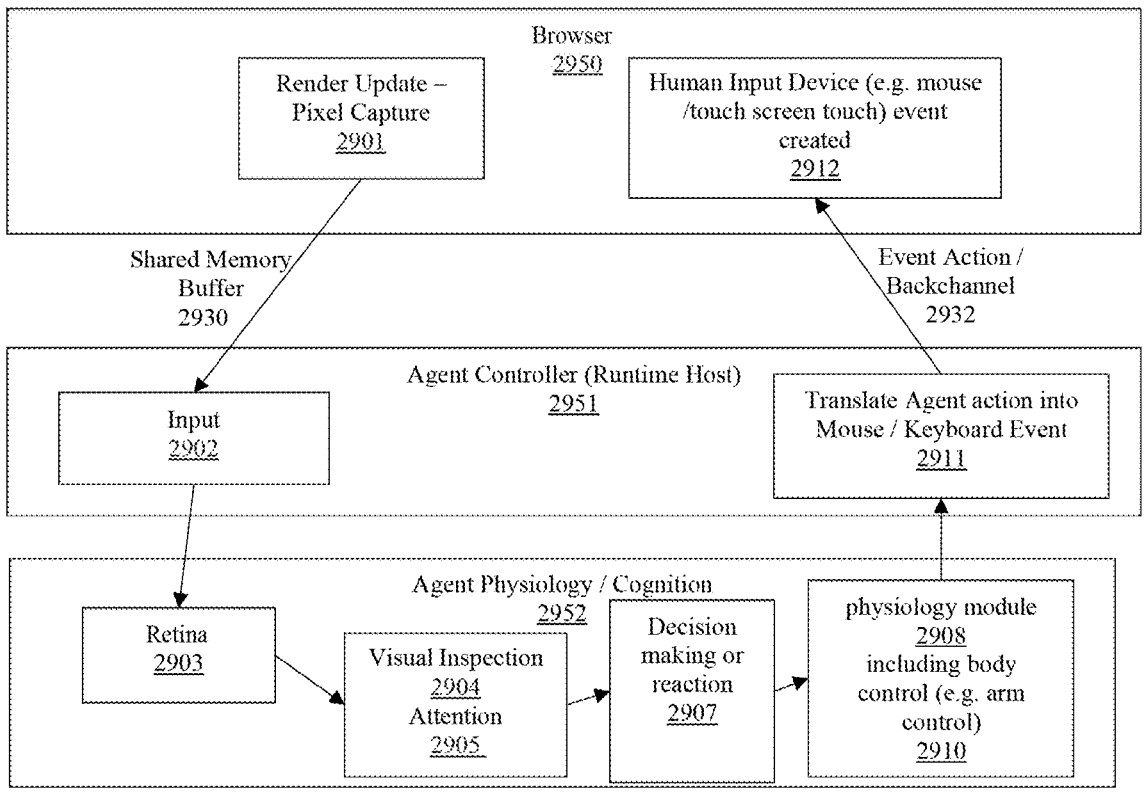
FIG. 17 shows a schematic diagram of interaction with digital content using the agent's computer vision system.

FIG. 17 shows a schematic diagram of interaction with digital content using the Agent's computer vision system. The modules referred to are not necessarily modular components of code, but may be functional networks of modules driven by a highly interconnected neurobehavioural model. At 2901, an end-user-computing device user interface (such as a browser), renders an update to the display (e.g. a webpage redraw). Via a shared memory buffer 2930, an Agent 1 controller 2951 provides the pixels from the display as input 2902 into the Agent's retina 2903. This is an interface between the programmatic definition of the Agent and the pixel streamer. The pixels may then be provided to a cognition module 2952, within which a visual inspection module 2904 performs image processing. The parts of the pixel stream which are being focused on/processed may be guided by an attention module 2905, which determines what the Agent pays attention to. Information resulting from the processing of the pixel data may be passed to a reactive and/or decision-making module 2907. This drives the behaviour of the Agent. For example, after recognizing part of the image as a button, the reaction and/or decision making module 2907 may cause the Agent to reach out and touch the button 2910. The action or behaviour the Agent takes is passed to a simulated physiology module 2908, which may have sub-components for control of various parts of the body, including arm control 2910. At 2911, the Agent controller 2951 may operate to map interaction between the Agent and digital content into User 3 interface interactions. In the virtual environment, "physical" actions by the Agent in the AVE may be translated as actions on a User 3 interface. For example, when the coordinates of an Agent's body intersect with a perceived Shared Environment Plane, the coordinates of the intersection of the plane can be translated to a mouse click or touchpad touch event at a corresponding pixel location on a user-interface. An event action/backchannel 2932 is then sent to the computing system as a human input device event (e.g. mouse click at the corresponding pixel location on the browser). In one implementation, the Chromium Embedded Framework (CEF) open browser implementation is adapted to enable an Agent to interface with web digital content. Offscreen rendering allows the content of a browser window to be output to a bitmap which can be rendered elsewhere.

Embodied Interactions Corresponding to (Triggering) Events

Touching a digital content item is one type of embodied interaction which may result in interaction with the digital content item however the invention is not limited in this respect. In other embodiments, specific gestures of the Agent which are directed at a digital content item may trigger an event on that item. For example, the Agent looking at an item and blinking may trigger an event on that item. Another example is gesturing at a digital content item, for example, a button.

Direct Control of Browser or Computing System

In one embodiment, the Agent has direct control over a mouse, touchpad or other primary input device, as if the input devices are effectors of the Agents. In other words, the Agent can control the input devices in the same way that it controls its own body/muscle movements. In a computing device, direct control of the computing device by an Agent may be enabled by any suitable technology, e.g. such as technology enabling remote access and remote collaboration on a person's desktop computer through a graphical terminal emulator.

Salience Maps

The attention module 2905 may include "salience" maps to guide the attention of an Agent. A salience map is a representation of the screen to an Agent in terms of importance. Salience maps may define where the attention and focus of an Agent is. Examples of features which may be differentially treated as salient or not include:
- Users: The Agent may include a face detection module to detect faces. Face detection may be relevant to the Agent's emotion affects and user interaction loop. A face detect module uses face tracking and solving libraries to find faces in the Agent's visual input stream. The presence of a face may be interpreted by the Agent as a highly salient visual feature. The solved facial expressions from any detected faces may be fed into an expression recognition network.
- Movement—a motion detect module may be provided, as the vision module does not attempt any perceptual processing of the video input. The motion detection module may be a component of the Agent's visual perception system, comparing temporally adjacent video frames to infer simple motion. A resulting "motion map" may be used as a driving element of visual salience
- Recognition of certain objects or images
- Recognition of text; salience attributed to certain key words or textual patterns
- Colour
- Luminance
- Edges Salience maps may be user-defined. In one embodiment, a User may interactively communicate to the Agent which features the User wishes the Agent treat as salient (focus on). Where multiple salience maps are used, each salience map may be weighted with the ultimate focus of attention of an Agent being driven by a weighted combination of each active salience map. In other embodiments, salience may be defined externally, and provide artificial pointers to mark digital content items for the Agent to focus on.

Switching UI Control Between User and Agent

The User and the Agent may both control the mouse, keyboard or other primary input mechanism. In one embodiment, a mechanism for collaboration is provided in the form of a control mechanism which ensures that once either party moves the mouse, until the initiated action is completed, before allowing the other party to move the mouse. The control mechanism may enforce turn taking between the User and the Agent. In other embodiments, the User and Agent may use dialogue to determine who has control of the UI (for example, the User may ask the Agent if they can take over control or vice versa).

Perception Control

The Agent may have control over its perceptual input. For example, it may choose to view the User rather than the content, or vice versa. An advantage of enabling perception in the Agent via visual pixel recognition is that it provides freedom/flexibility of what the Agent may look at/focus on and therefore perceive (using a "Fovea" subset/area of a pixel stream which is displayed to the Agent at a higher resolution). The Agent may focus on any pixel displayed on a user-interface, or any super-structure/aspect of what is displayed on a user-interface, such as patterns created, colours, or objects represented.

Integration With Agent Simulator

Figure 23:
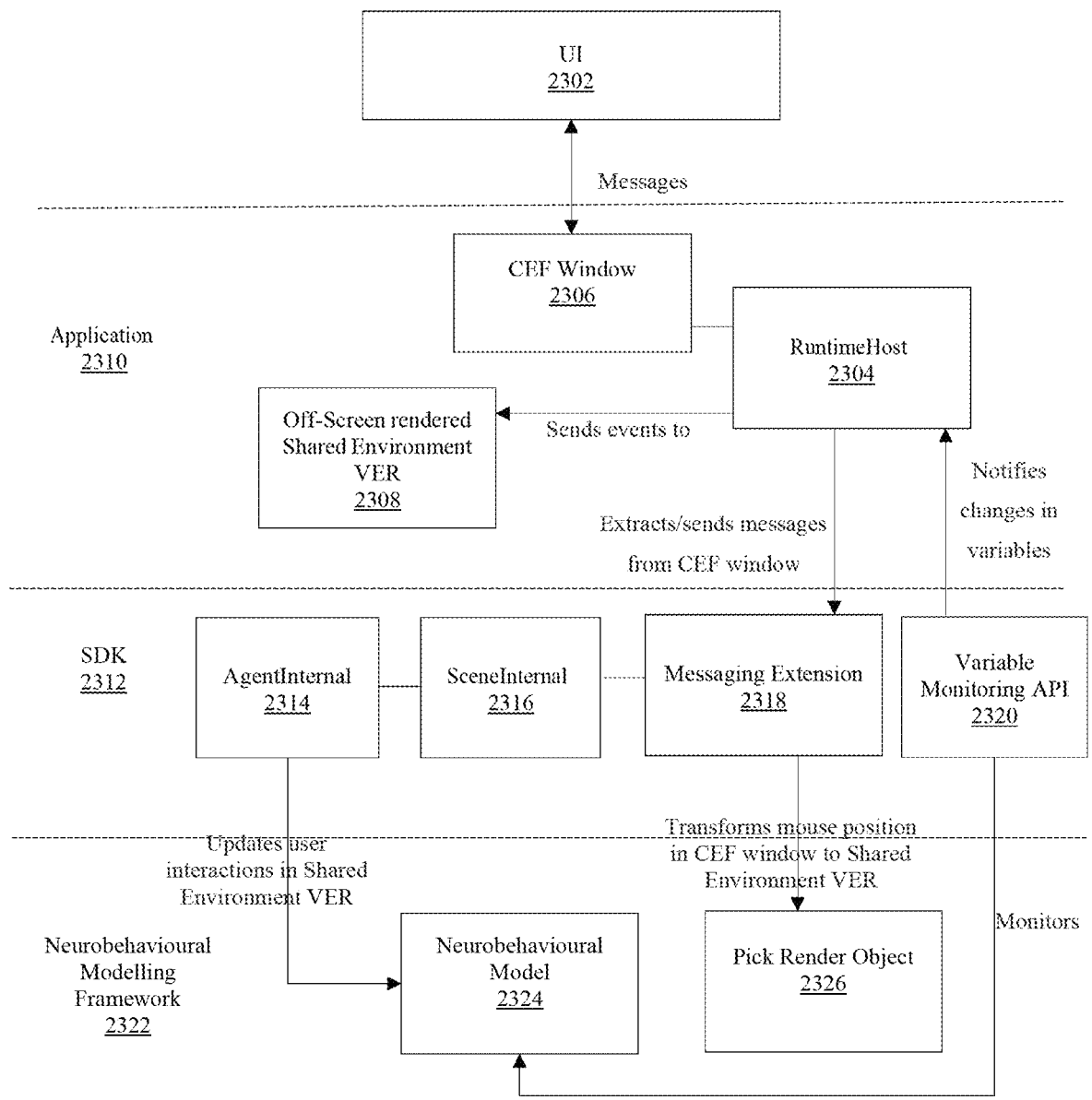
FIG. 23 shows a class diagram of an example implementation of user agent interaction.

FIG. 23 shows a class diagram of one implementation using a CEF browser. A CEF window defines what the user sees on a UI. Variables may be defined within the Agent's neurobehavioural model to store the interactions with Shared Digital Content (e.g. browser content). One set of variables may be for the User's interactions, and another set of Variables may store Agent interactions. The Agent's set of variables may be set by the runtime through the neurobehavioural modelling language. A Runtime Host 2304 may set up variable monitoring for both sets of variables. Upon receiving updates to these variables, Runtime Host 2304 constructs UI events (e.g. mouse/keyboard events), and sends them to Shared Environment VER (which may correspond to a Plane in the Agent's environment through which the Agent views Shared Digital Content. The Shared Environment VER is owned by the Runtime Host but is off-screen rendered into a buffer, and Runtimehost sends the buffer to the neurobehavioural modelling framework (simulator), for the neurobehavioural modelling framework to render the content into the 3D space.

When the user interacts with the browser, the UI sends set variable messages to the SDK, eg, user_mousedown, user_mouse_x. The coordinates received from the UI is in relation to Off-Screen rendered Shared Environment 2308 (the Agent's window). The coordinates are transformed into the x y positions in the browser. A neurobehavioural model method transform the coordinates and determine whether the browser object contains the mouse. The Runtime Host then construct mouse and key events and forward to the Shared Environment (shared browser).

When the Agent interacts with the Shared Environment 2308, the Runtime Host 2304 receives callback for monitored variables has changed. If there are no user events in the same callback, the Agent's interactions are forwarded to the shared browser. Otherwise the user's interactions override the Agent's ones. Neurobehavioural modelling language variables for shared interactions may be defined such as:

- To track mousedown and mouseup events variables: user_mousedown, user_mouseup, persona_mousedown, persona_mouseup
- To track keydown and keyup events variables: user_keydown, user_keyup, persona_keydown, persona_keyup
- To indicate the an event (e.g. mouse event or keyboard event) is happening, a neurobehavioural modelling framework variable (e.g. user_mousedown/user_mouseup/agent_mousedown/agent_mouseup) is different from last time-step. Instead of using I/O switching to indicate the event is happening, a counter counts the event and adds 1 to previous value each time, once it reaches 1000, the counter is reset 1. The reason for this is because the down and up (on, off) can be on the same time-step, to keep track of all events, the variable's current value and previous value need not match. This ensures events are not lost. A queue may be implemented to facilitate rapid and/or simultaneous input/output events (faster than the Agent's Timestepping). An AgentInternal 2314 may control the rate of Agent timestepping and update user interactions in the Shared Environment VER.

Interaction Module

An Interaction Module may facilitate Agent perception of Shared Digital Content and define and communicate to the agent the interaction affordances of content items represented in the Agent's virtual environment. The Interaction Module may be a support library or Application Programming Interface (API). When the Agent 1 decides to take a certain action, the Interaction Module 16 translates the action into a command as natively defined by the author of the third party digital content. The Agent can directly and dynamically interact with Digital Content (e.g. web content, application content or other programmatically defined content) by using the Interaction Module. The Interaction Module translates between digital content defined by computer program readable information, and Agent understandable information.

Shared Digital Content items may be represented to the Agent as Conceptual Object which are abstractions of the native (or natively rendered) Digital Content items. Conceptual Objects may be defined by certain properties such as virtual-world environment coordinates, colour, an identifier or anything else which is relevant to the interaction between the Agent and the respective Digital Content items. A Conceptual Object is an object that represents real digital content items, in an abstracted way that translates across the AVE. The Agent 1 only needs understand the 'concept' and metadata related to the concept (i.e. size, colour, location/position).

The native digital content items exist and are presented to the User in their native format, however the digital content items have additional identities which the Agent 1 can use to refer to the digital content items. In one embodiment, the Agent sees Shared Digital Content items/objects via the Interaction Module 16 translating HTML information about those objects and passing them to the Agent 1. The Interaction Module 16 may abstract out native digital content item information, such as HTML information and translate this to the Agent 1 so that the Agent 1 can understand what the content item is, its properties, and what input may be required.

Figure 5:
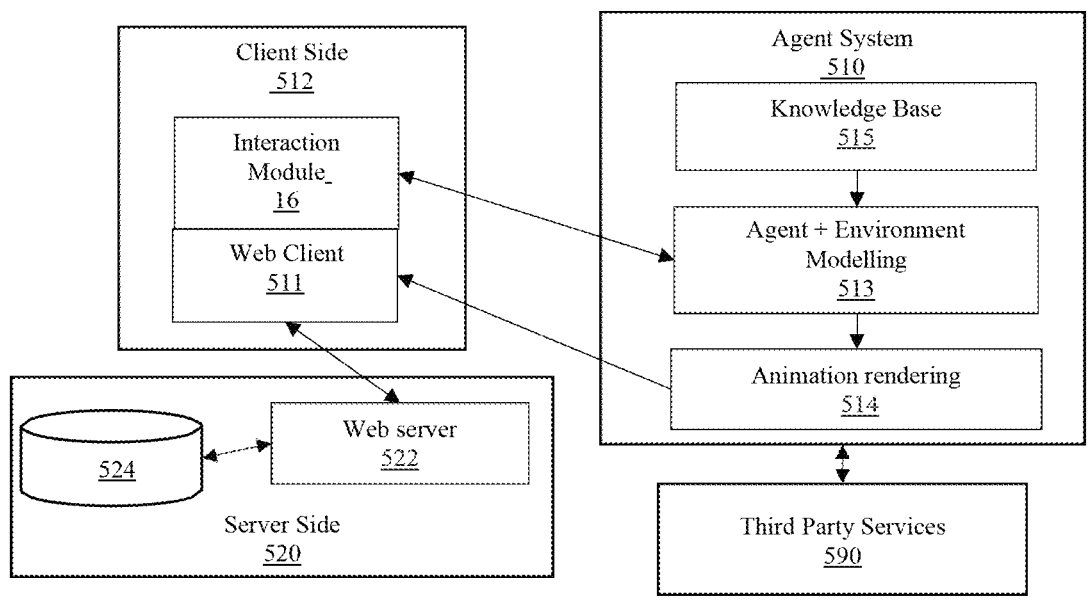
FIG. 5 shows a system diagram for human computer interaction.

FIG. 5 shows a system diagram for human computer interaction facilitating User 3 interaction with a web page. The system may include a client side 512, a digital content provider server side 520, and Agent side (agent system or simulation) 510, and optionally, communication with third party services 590. The digital content provider may define digital content on a web server 522 and/or a server-side database 524. The web server 522 may serve digital content to a web client 511, such a web browser, viewable by a User. Human computer interaction is facilitated by including an Interaction Module 16 on the client side 512. The Agent is simulated on an Agent system 510, which may be a cloud server. The Interaction Module 16 processes digital content (which may be defined, for example, by HTML code), and translates items relevant to the Agent such that they are perceivable by the Agent. This may provide the Agent with a contextual map of content items on the web page. The Agent and the Agent's virtual environment reside on an Agent system 510. The Agent system 510 includes an Agent modelling system 513 which simulates the Agent within the Agent's virtual environment, an animation rendering system 514 for rendering a display of the Agent. A knowledge base 515 may provide the Agent with a base level of domain knowledge about the environment it is in and the types of content items it can interact with. The Agent may be supported by third party services 590 (for example a third party provided natural language processing system).

Figure 6:
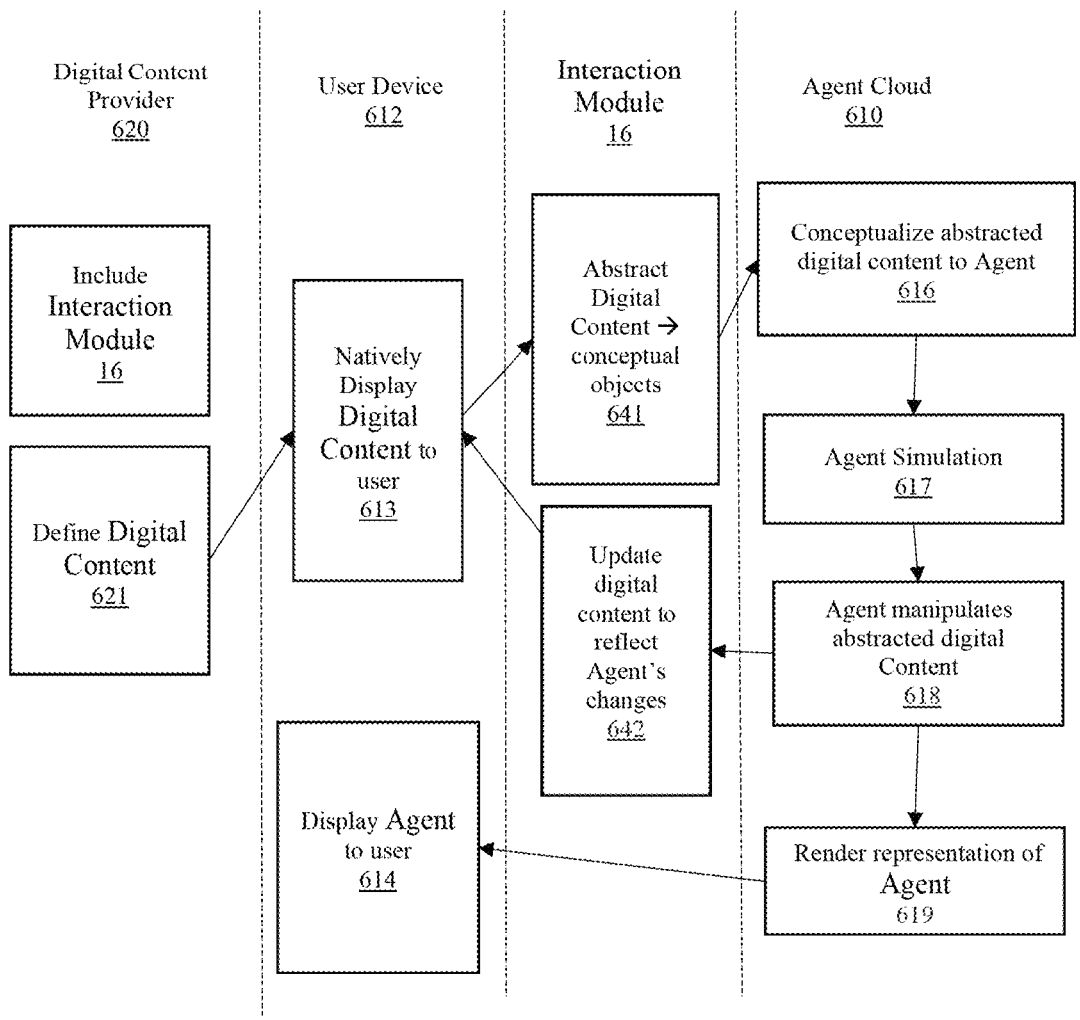
FIG. 6 shows a process diagram for human computer interaction.

FIG. 6 shows a swim-lane process diagram for human computer interaction. A digital content provider 620 defines digital content items 621. The digital content provider 620 provider includes an Interaction Module 16 linked to the digital content items 621 such that the digital content items can support Agent interaction. To augment digital content with Agent 1 interaction, the digital content provider may enable this by linking to or including the Interaction Module 16 when defining the website. In another embodiment, if Interaction Module 16 is not linked to, a proxy server may be provided through which to run digital content which links or includes an Interaction Module 16 enabling interaction via an Agent 1.

A User device 612 natively displays digital content items to Users interacting with the webpage, application or other computer program defined by the digital content provider 620. The Interaction Module 16 translates certain digital content items from their native definition into Conceptual Objects. The Conceptual Object are sent to the Agent 1 cloud 610 allowing an Agent 1 to conceptualize the digital content 616. The Conceptual Objects are input for an Agent 1 simulation 617. Therefore, the Conceptual Objects form part of the Agent 1's environment. Accordingly, the Agent 1 may interact with or change its behaviour based on the Conceptual Objects. The Agent 1 may directly manipulate digital content 618 for example, pressing or moving a Conceptual Object. When an Agent 1 directly manipulates a Conceptual Object, the Interaction Module 16 translates the Agent's action into a change to the digital content item. In other words, the Interaction Module 16 updates 642 the digital content to reflect the Agent 1's changes to the content item. It is also possible for the Agent to indirectly interact with the Conceptual Object, such as by looking towards or gesturing at the Conceptual Object's location. A representation of the Agent 1 either directly or indirectly interacting with the Conceptual Object is rendered 619.

The Agent may not perceive content items directly the same way a User would (such as through pixel recognition). The Interaction Module 16 may pass a "conceptual object", such as an abstracted representation of the content items, to an Agent. The conceptual object may include basic properties relevant to the Agent 1's interaction with the item such as a tag defining what the content item is and a location. The Interaction Module 16 may provide the Agent 1 with a list of affordances of the content item in the context of the Agent 1's virtual environment. The conceptual objects corresponding to the content items may include further information defining the objects with "physical qualities" which the Agent 1 can interact with.

The Interaction Module 16 may provide 'action' support allowing a User 3 to interact with digital content items via the Agent. This 'interaction' functionality provides an abstraction layer for the Agent 1 to perform 'actions' on an object. Examples of actions are press, drag, push, look at, grab etc. These actions are translated by the Interaction Module 16 into an operation that can be performed on a digital content item at that time and in a way that works for the interaction space. Actions that do not translate can be ignored. For example the Agent 1 could 'action' a press on a web button, which would be translated by the Interaction Module 16 into a click on the button HTML element. A 'push' action on a web element might be ignored, but when actioned in a 3D interaction space on a ball would result in the ball moving.

For example, an Agent wishing to scroll down a web page, can send a scroll down command to the Interaction Module, which in turn can translate the Agent 1's action into web readable command, such as JavaScript code. The JavaScript code actuates the action on the web page. Thus, the Agent need not be able to communicate directly in web language. This makes the system extensible, as the Agent 1 can be applied to different contexts.

In another example, an Agent wishing to input text into a content item can send an input command to the Interaction Module 16. The Interaction Module 16 may execute the necessary JavaScript command to place the cursor within that text field, and input the text the Agent wishes to input. Thus in a web interaction context, the User's view of the digital content items may be a full fidelity web page with correctly stylized web elements (e.g. HTML elements). The Agent may have an abstracted visualization of that HTML page made up of conceptual objects. Conceptually, this is analogous to the Agent seeing a simplified view of the webpage with only aspects of the webpage which are relevant to the Agent's interaction with the User and the webpage.

In addition to translating information from a web language to an agent-perceivable information, the Interaction Module 16 may translate "physical" Agent actions on conceptual objects into instructions for movement of the corresponding digital content items. Instead of manipulating content items directly via native methods, the Agent manipulates content items as if they were physical items, within their virtual environment. To this effect the Interaction Module 16 may further include a physics translation for moving HTML elements in a manner which simulates physics. For example a 'physics' type action such as pushing a content item may be translated to the HTML element, by the Interaction Module 16 moving the object by a certain amount at a certain number of frames per second thereby 'simulating' a physical push. Thus various 'actions' the Interaction Module 16 contains may either directly implement or simulate (by approximating) a change on an element, like its position, contents or other metadata.

In some embodiments, the Agent 1 may send a query to the Interaction Module 16 to obtain additional information about that item. For example an Agent 1 wishing to "read" text within an item (which in HTML is a text field) may query the Interaction Module 16 to get their text within the text field.

Dynamic Control

Digital content items may include web elements which may have a set of parameters established by the document designer to define the initial structure and content of the element. These include both the physical features of the element, such as the absolute or relative spatial location of the element within the document, as well as the attributes to be applied to any User text content entered in the element, such as font type, font size, font colour, and any font attributes such as bolding and italics. The document could also be designed to allow the User to reposition one or more of the elements by conventional click-and-drag techniques. Where digital content is in the context of a webpage, an Interaction Module 16 such as a JavaScript Interaction Module 16 may be provided to enable an Agent 1 to modify the physical features and/or attributes of web elements. Elements in an HTML page may be controllable after the page is rendered via Dynamic HTML (DHTML), a combination and interaction of several Web-related standards, including HTML, CSS (Cascading Style Sheets), DOM (Document Object Model), and scripting. A browser may create a Document Object Model (DOM) when a web page is loaded, representing HTML elements on a page. JavaScript can be used to interact with the DOM (an interface in the browser that allows programs to access and change the content, structure and style of documents). The JavaScript Interaction Module 16 may include methods which specifically enable specific types of interaction between the Agent 1 and the webpage by the DOM.

The QuerySelector may be used to query the DOM. The Interaction Module 16 may enable an Agent 1 to modify a webpage by:
  Changing/removing HTML elements in the DOM or on the page
  Changing and/or adding CSS styles to elements
  Reading and/or changing element attributes (href attribute on anchor text, src attribute on image text, alt attributes, or any custom attributes)
  Creating new HTML elements and inserting them into the DOM/the page
  Attaching event listeners to elements. For example, event listeners may listen for clicks, keypresses and/or submits, and react to these in JavaScript.

Whilst dynamic control of a webpage has been described with reference to a JavaScript Interaction Module 16, the invention is not limited to this respect. For example, in another embodiment, JQuery may facilitate interaction between the Agent 1 and the digital content. The Interaction/support module may be implemented in any suitable web-related open technology standard.

Other Interactions Contexts

Figure 8:
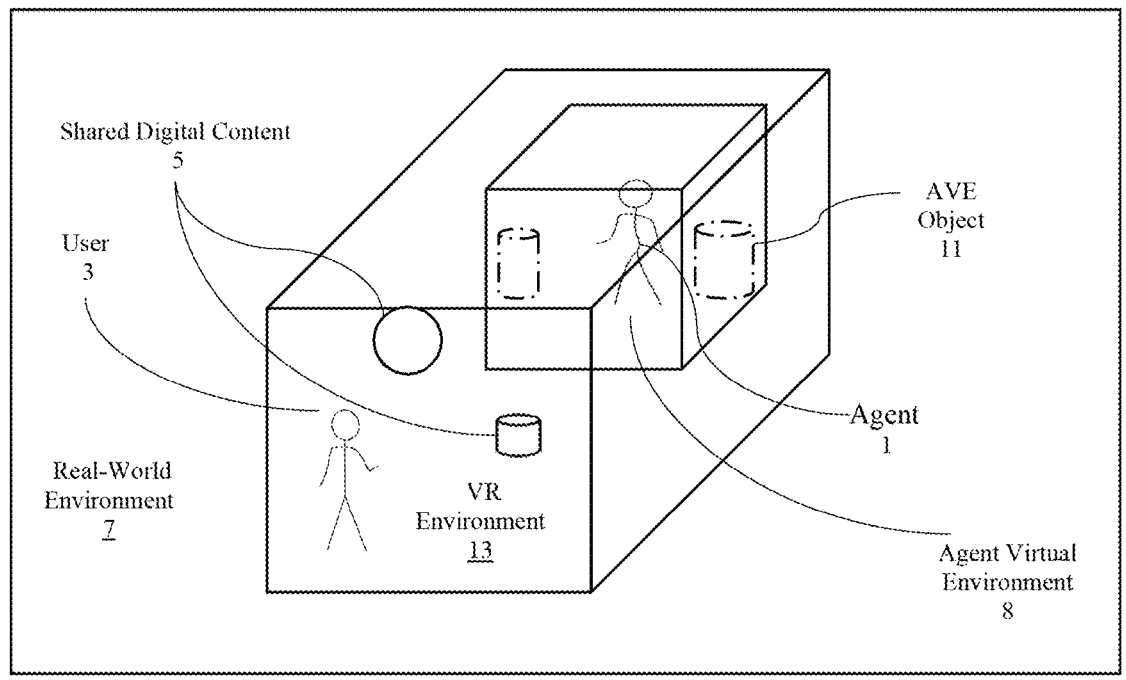
FIG. 8 shows user interaction in a virtual reality context.

FIG. 8 shows User 3 interaction in a virtual reality context such as a virtual reality environment. The methods and systems for user interface interaction described above similarly apply to virtual/mixed/augmented reality interactions. A conceptual shared environment may also be provided, including a set of objects which can be accessed by both a User 3 and an Agent 1. An Interaction Module 16 may be used to translate between Agent 1 space and User 3 space. The Interaction Module 16 may be embedded into a virtual reality application (VR Application) having a Virtual Reality Environment (VR Environment). The Interaction Module 16 facilitates visual congruity in the interaction between the Agent 1 and digital content items. Alternatively, and/or additionally, the Agent may be provided with full-fidelity computer vision of the Shared Digital Content defined by the VR Environment (and likewise with the augmented reality embodiments described below).

A User 3 in the Real-World Environment 7 views a 3D VR Environment 13, which may include Shared Digital Content 5 including 3D objects. A Interaction Module may translate Digital Content from the VR application into Conceptual Objects 9 perceivable by the Agent 1. The Agent 1 therefore can directly or indirectly interact with the Conceptual Objects 9 or refer to the Conceptual Objects 9. When the Agent 1 directly interacts with a Conceptual Object 9, for example, pushing a cylinder along the virtual floor of the Agent 1's environment, the Interaction Module 16 translates this to a change in the digital object natively defined in the VR application. FIG. 8 shows the Agent Virtual Environment 8 as being smaller than the VR Environment 13, however the Agent 1's Agent Virtual Environment 8 may be coextensive with, or larger than, the VR Environment 13. The Agent 1 may pass items in the shared environment to the User 3. For example, the Agent 1 may pass a soccer ball which is Shared Digital Content to the User 3. In one embodiment, ray-tracing is used to simulate vision for the Agent 1 within a three-dimensional scene. An interface may cast rays into the three-dimensional scene from a view point of the Agent 1 and may perform ray-tracing with the rays to determine if objects are within the Agent 1's field of view. The Agent 1's behaviour may thus be based on whether or not Shared Digital Content 5 is within its field of view.

Figure 9:
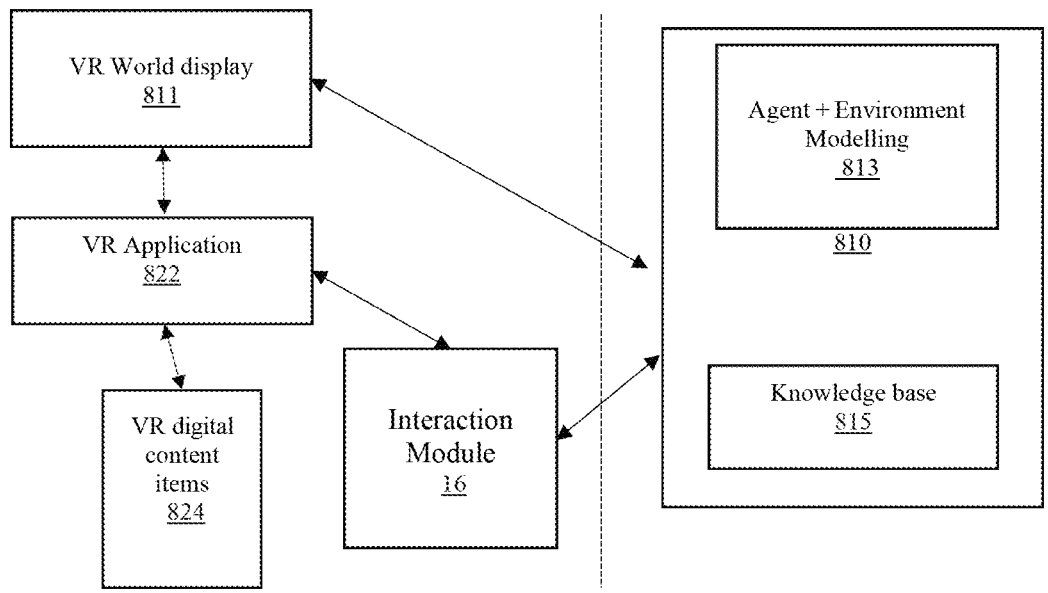
FIG. 9 shows a system diagram for human computer interaction in a virtual reality context.

FIG. 9 shows a system diagram for human computer interaction in a virtual reality context. VR digital content items 824 may be defined in a VR application 822 and displayed to a User 3 on a VR display 811. A Interaction Module 16 translates VR digital content items (e.g. VR objects) into Agent 1 perceivable Conceptual Objects. The Agent 1 can therefore interact with the perceivable Conceptual Objects. This interaction is then translated by the Interaction Module 16 to reflect corresponding changes on the VR digital content items. The VR application may render a scene to a User 3 including the Agent 1, any aspects of the Agent 1's environments and digital content items, facilitated by the Interaction Module 16. The Agent 1 system 810 may also include a knowledge base 815 enabling the Agent 1 with knowledge about a certain domain within which the Agent 1 is interacting.

Figure 10:
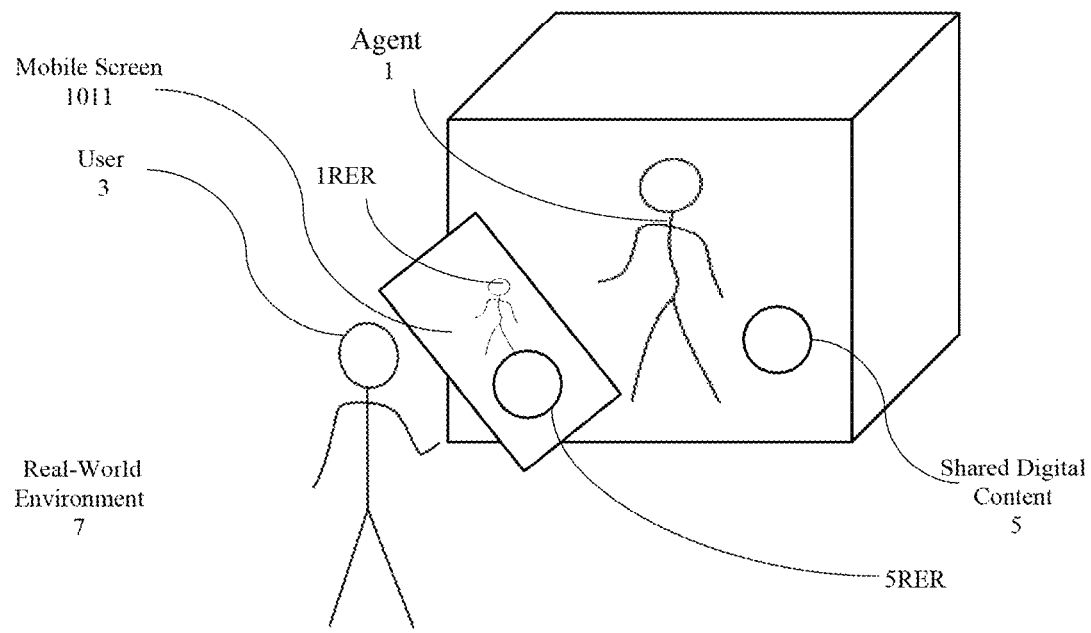
FIG. 10 shows user interaction in an augmented reality context.
Figure 11:
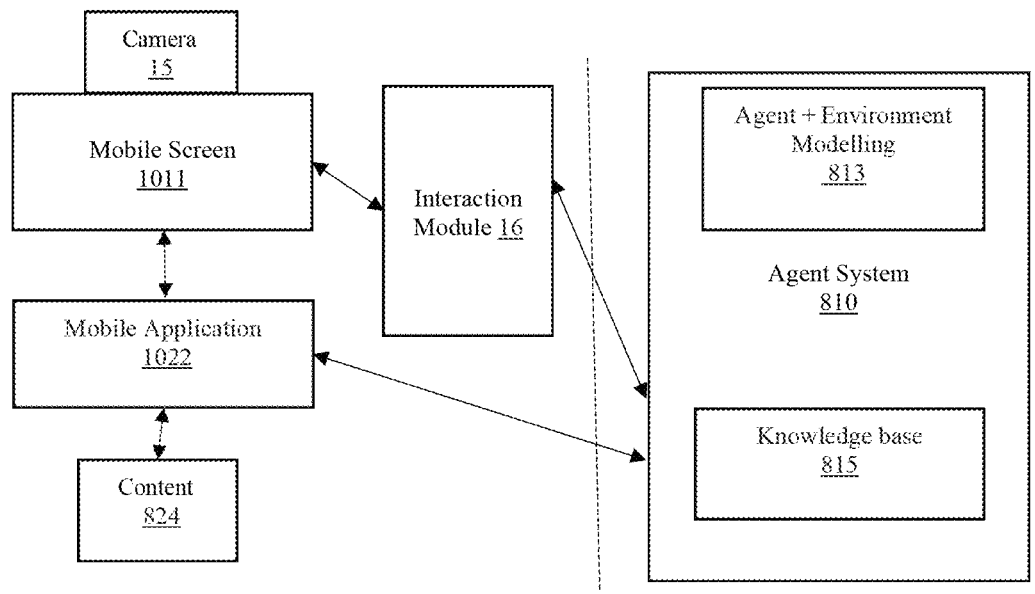
FIG. 11 shows a system diagram for human computer interaction with a mobile application.

FIG. 10 shows user-interface interaction in an augmented reality context. The interaction is similar to that described with reference to virtual reality, except that the User views virtual digital content through a view port, shown as a mobile phone screen, for example), which may be overlaid onto a view of the real world. FIG. 11 shows a system diagram for human computer interaction with a mobile application. Content items 824 may be defined in a mobile 1022 and displayed to a User 3 on a display 1011 such as a mobile device screen. A Interaction Module 16 translates mobile application digital content items into Agent-perceivable conceptual objects. The Agent 1 can therefore interact with the perceivable conceptual objects. This interaction is then translated by the Interaction Module 16 to reflect corresponding changes on the mobile application.

In one embodiment, the Agent 1 lives in WEB GL; everything in the scene may be an object that the persona can manipulate. WebGL (Web Graphics API) is a JavaScript API for rendering interactive 3D and 2D graphics within any compatible web browser without the use of plug-ins. The webGL compatible browser provides a virtual 3D space that the Agent 1 is projected into. This allows the virtual space that the Agent 1 operates within to be presented on any compatible web browser or WEB GL compatible device and allows the Agent 1 to interact with web object and 3D object within the same virtual space.

Rendering of the Agent Relative to Digital Content

An animation renderer may render animation of the Agent and the Agent's environment for display to a User. The resulting animation may then be streamed to a UI device (such as a browser), as a video stream. In one embodiment, the Agent may be rendered in a confined region of an end User display. In a web-context, the Agent may be bounded in an HTML DIV element. In another embodiment, the display of an Agent on an end User-display may be unbounded.

Pixels may be blended such as that either the Agent or the digital content is transparent and allows viewing of what is behind the Agent or digital content respectively. In the case that the AVE is a 3D environment, and the display is a 2D screen, the AVE may be rendered as a 2D animation from the viewpoint of the User. The AVE may be rendered as a moving background or foreground to the Digital Content (for example comprising natively rendered HTML web elements) for an interactive User-experience.

The Agent's virtual environment may be presented to a User via one or more perspectives. The Agent and/or the User may change the viewport of the User into the Agent's virtual environment. For example, in a pinhole camera model of rendering of the Agent's environment, the Agent may change the pinhole location to change angle/direction and/or zoom of the User's view of the Agent's environment. Instead of rendering animation of the Agent's environment (which can be computationally intensive), in some embodiments a 2D representation of a certain view corresponding to the Agent's view (from the vantage point of the Agent) may be rendered and represented to the User.

Overlay of Camera Image

Figure 19:
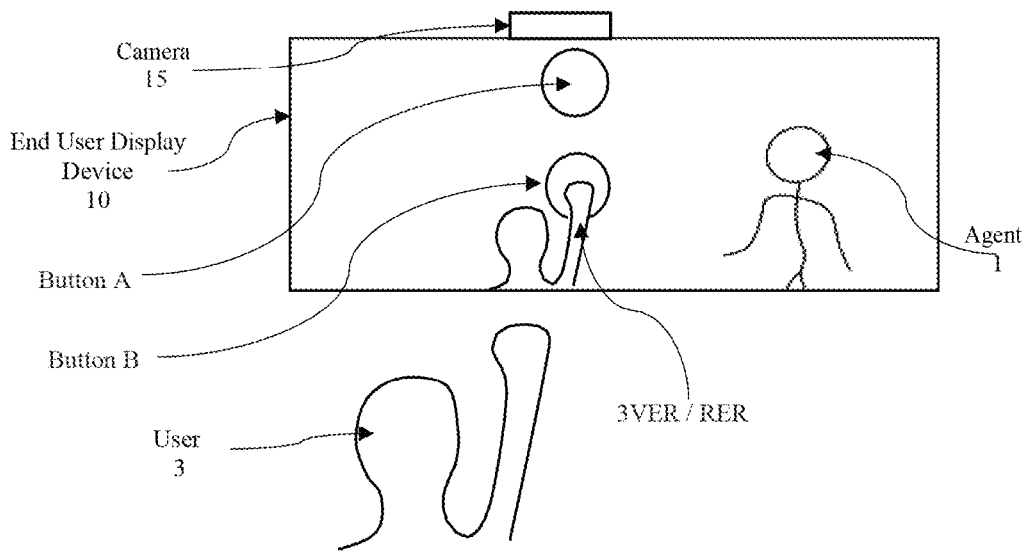

The User can draw the Agent's attention to or point at/indicate an area on a computer screen using gesture. FIG. 19 show an example of how a User's representation (3VER and/or 3RER) captured by a Camera 15 is displayed on a screen 10. The representation may be overlaid on whatever else is being displayed on the screen 10 and may be semi-transparent, enabling the User 3 to see both the User 3's body as well as the other contents of the screen 10.

Alternatively, the background of the User 3 may be automatically cut out (using standard image-processing techniques) such that only the User 3's image or hand is displayed on the screen, such that the representation need not be transparent. In a further embodiment the User 3's representation is only visible to the Agent 1. Two buttons, A and B are displayed on the screen 3120, and the User 3's hand 3145 is hovering over button B. The representation of the User 3s hand is visible on the screen. The Agent 1 is able to see the same representation that a User 3 sees and can therefore also see which button the User 3 is drawing attention. A salience map may draw importance to human hands, or movement (the User 3's hand may be moving over button B to draw attention to it. Thus, the User 3 may interact with a non-touch-screen screen in a similar manner to a touch screen. User gestures (e.g. finger click) can be translated to input device events (e.g. click) using the Interface Module. In other embodiments, instead of the User 3's representation being displayed on a screen, the User 3 may receive some other visual indicator of where the User 3 is indicating, such as by the Agent 1 looking at that direction. In a similar manner the Agent 1 may be able to perceive where the User 3 is looking on the screen by tracking the User's gaze, or from verbal instructions/directions from the User 3.

Variations

A plurality of Agents may independently interact with digital content. The plurality of Agents may engage in dialogue with one another, as well as with User/s. The plurality of Agents may be simulated within the same virtual environment, or they may be simulated within different virtual environments from one another. The plurality of Agents may have the same sensory capabilities, or they may have different capabilities from one another. One or more Agents may interact with a plurality of Users. Any one or more of the Users may converse with the one or more Agents and direct the one or more Agents to manipulate a User-interface the Users are interacting with as described herein.

Combining Computer Vision & Interaction Module
16

The Computer Vision and Interaction Module embodiments may be combined. In one embodiment, the Agent may be perceptually aware of features of content items such as images by processing the pixels of the images. This allows the Agent to discuss features such as the colour or colours of the items.

Agent Knowledge

Agents may also be able to access object metadata, for example, from a provided object database. An example is a catalogue of purchase items. An Agent 1 may associate a digital content item with a purchase item in a database catalogue, and use this information to converse with a User 3. Agents may control navigational or display aspects of a User 3 interface. For example, in a website context, the Agent 1 may control what part/s of a webpage are displayed by scrolling up, down, left or right, or zooming in or out.

Persistent Agent Browser

In one embodiment the Agent may understand the nature of certain digital content items such that the Agent can be integrated into different digital content sources (for example, different websites). Thus the Agent can facilitate User content interaction in a scalable manner across the internet. Such an Agent may be provided via a bespoke browser. The Agent may be trained using machine learning techniques to understand the nature of web-language learn associations between content items and actions that can/should be taken in relation to such content items. For example, the Agent 1 may be trained to identify text fields regardless of the exact configuration of the text fields, read the user-visible label of text fields, and fill out those fields on behalf of a User.

In one embodiment, a User may teach an Agent about digital content items. The User may, for example, hover a mouse over a digital content item and name the item. The Agent may observe this and associate the item's name with the digital content item's representation (either pixel representation or conceptual representation provided by a Interaction Module).

Embedded Actions and Agent-Perceivable Locators

Figure 18:
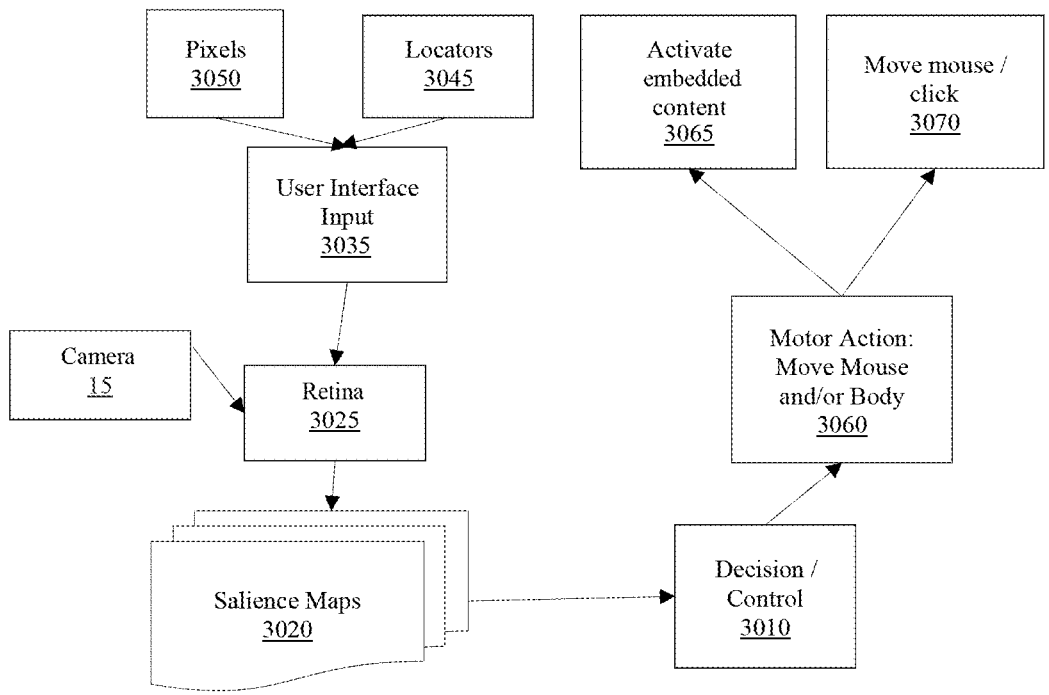
FIG. 18 shows digital content associated with embedded actions and/or agent-perceivable locators, FIG. 19 show an example of how a User's representation captured by a camera is displayed on an end user display.

In one embodiment, as shown in FIG. 18, digital content may be associated with embedded actions and/or Agent-perceivable locators. An Agent-perceivable locator locates a digital content item (and may be associated with a spatial coordinate corresponding to the digital content item within the Agent Virtual Environment). Locators may be associated with metadata describing the digital content item. Locators may replace and/or support salience maps. In one example of a locator replacing salience maps, the locator corresponding to a button is tagged with metadata indicating that it must be clicked on by an Agent 1. In an example of a locator supporting salience maps, locators are placed on buttons (and may be automatically generated by reading the HTML contents of a web page and assigning locators to items with HTML button tags). A salience map of buttons may be provided along with any other salience maps, for example a colour salience map, and for example, the salience maps may be configured to encourage the Agent to click red buttons. Embedded content may be provided in a website, which is accessible by an Agent but not necessarily a User. For example, embedded content visible to an Agent may allow an Agent to click a link not visible to a User and navigate to another page or read information not visible to the User.

Conversational Interaction

The Agent 1 can engage in conversation with humans employing the same verbal and nonverbal means that humans do (such as gesture, facial expression, and so forth). The responses may comprise computer-generated speech or other audio content that is played back via one or more speakers of an end-user computing device. The responses generated by Agent 1 may be made visible to the User 3 in the form of text, images, or other visual content to the User 3. The Agent 1 may converse with the aid of a $3^{rd}$ party service such as IBM Watson or Google Dialogue Flow and/or a conversational corpus.

Figure 20:
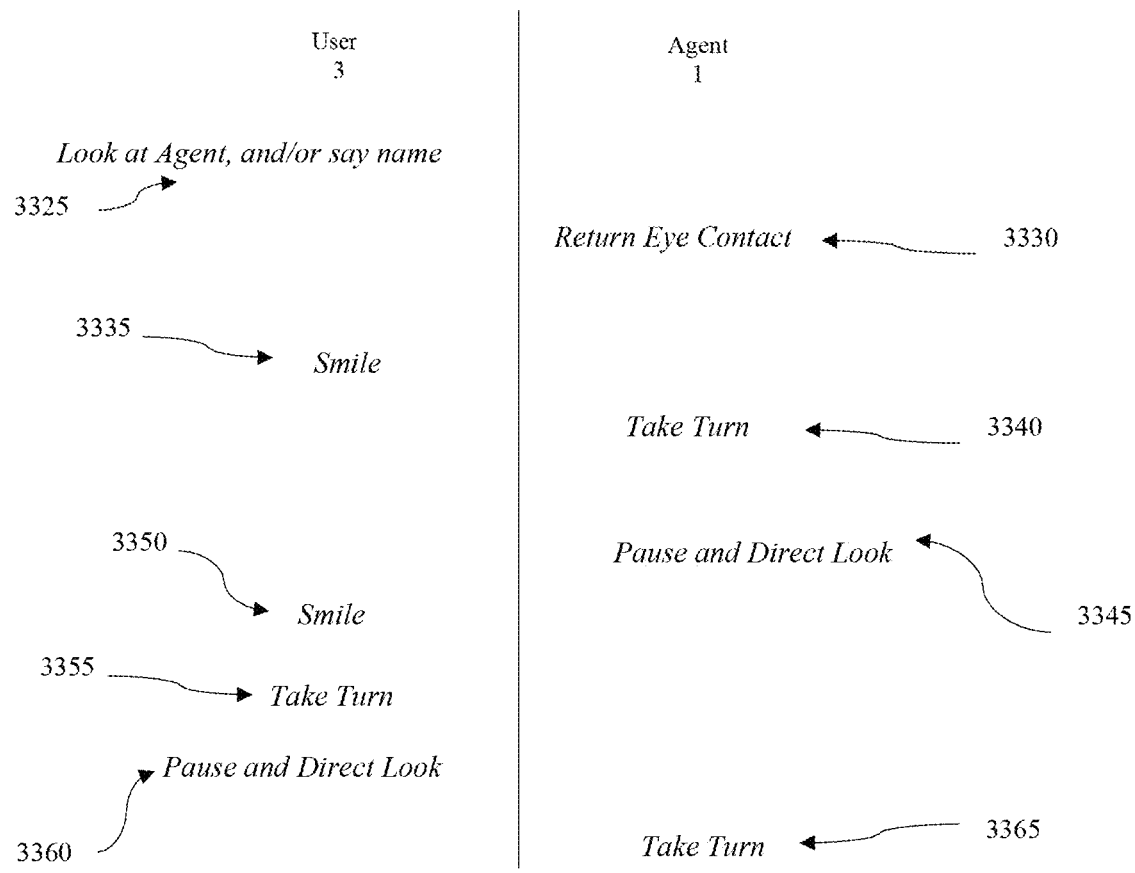
FIG. 20 shows an example of turn-taking.

FIG. 20 shows a User 3. The Agent 1 can look at the User 3. The Agent 1 may receive the following information about the User 3, and use this information to inform interaction both in the real and virtual world:

The embodied Agent may receive camera input and calculate where the User's gaze is. This may be mapped to a content item or an object in the User's space/real world which the User is looking at. The User's gaze may be tracked using the User's eye angle and/or the User's head angle.

The embodied Agent may additionally track the User's eye movement, head movement and calculate the User's eye and head angle.

The embodied Agent further receives verbal inputs including directions from the User which may in some cases direct the embodied Agent's actions and/or the embodied Agent's gaze. Other inputs may include text for example via a keyboard.

An embodied Agent having identified a User may follow the User's position, (look at the User) with their eyes, and by tilting towards the User.

The embodied Agent may be aware of where a user-controlled mouse is positioned on the screen, relative to the digital content items. The Agent 1 may further be aware of the User's touch by for example a touch screen monitor.

The embodied Agent may monitor via the camera the User's movement, in particular the movement of the User's arms, hands and fingers.

Facial expression may be used to detect User emotion and adapt accordingly.

The User's tone of voice may be used to detect User information so that the Agent adapts accordingly.

The Agent may ensure that the Agent has the User's attention before proceeding with conversation.

The Agent may have a memory of past interactions with the User and use this information in conversation.

The Agent may use the context of the conversation, digital content items, and User information to resolve ambiguity. The actions taken by the Agent may be dynamic, tailored to a User, or context sensitive, intention/goal oriented. The Agent may have access to sources of information about the User. For example, the Agent may have awareness of the location (e.g. via a geolocation service) and/or time zone of a User and use this to guide interaction accordingly. The Agent combines dialogue, emotion, cognition and memory to create an interactive user-experience. Embodiments provide a system for synthesising emotional and gestural behaviour of an Agent with content interaction. The Agent interacts with the User via dialogue and the User's actions including eye gaze, eye direction, movement of the User and other inputs received about the User to establish the User's goals, beliefs and desires and guide the User accordingly. The Agent may include emotional reaction modules which react to Users. In one embodiment, Agent interaction is guided by learned responses (such as reinforcement learning) or prescribed. Prescribed behaviour may be guided by a knowledge base of rules. In one embodiment, the manner in which the Agent interacts is guided by a psychometric profile of the User.

In one embodiment the simulated interaction between the embodied Agent and the User may be implemented using a dyadic turn taking model applied to the User's and embodied Agent's gaze. The embodied Agent may indicate the end of their conversational turn during an interaction by attempting a direct gaze with the User. In a similar manner the embodied Agent may perceive that the User has indicated the end of their turn when the embodied Agent detects that the User has initiated a direct gaze with the embodied Agent.

Referring to FIG. 20 an example of turn taking is illustrated. The User 3 may look 3325 at the Agent 1 or say the Agent 1s name or prompt the Agent 1 by for example pointing at the Agent 1. Once the User 3 has the Agent 1's attention the Agent 1 may return the User 3's eye contact 3330 signalling to the User 3 that the Agent 1 has recognised the User 3's attention. The User 3 in turn may respond with a smile, prompting the Agent 1 to proceed and take a turn to for example provide information or otherwise communicate with the User 3. Once the Agent 1 has finished the Agent 1 may signal to the User 3 by pausing and directly looking at 3345 the User 3. The User 3 in turn may smile and acknowledge the Agent 1 3350 and take a turn 3355. When the User 3 has finish the User 3 may pause and direct attention 3360 to the Agent 1 who may take another turn 3365. The above description is merely an example and the indication by the User 3 may take other forms that allow the Agent 1 to recognise that it is the Agent 1s turn. The User 3 may for example indicate the end of their turn during an interaction by verbal cues or non-verbal cues. The non-verbal cues may include for example smiles, winking, movement of the head, movement of the body including arms, hands and fingers. Likewise, the indication by the Agent 1 may take other forms that allow the User 3 to recognise that it is the User 3s turn. The Agent 1 may for example indicate the end of their turn during an interaction by verbal ques or non-verbal cues. The non-verbal cues may include for example smiles, winking, movement of the head, movement of the body including arms, hands and fingers.

Attention Modelling

Agent Attentional models may be implemented as saliency maps of regions in the visual field, in which visible locations compete for attention. Those locations that are more active have more salience. A saliency map is an image that shows each locations (pixel's) unique quality and so the locations that are more active have more salience. Several types of saliency that are active in the human brain may be implemented in the embodied Agent. These include a visual frame that updates every eye or head movement of the User 3 or embodied Agent 1. Other saliency maps use a reference frame that's stable irrespective of head and eye movements. Saliency features that may be mapped include colour or luminance or the interestingness of the stimuli present in the visual field. Yet other saliency maps can be created that focus on expectations or desires and from those expectations or desires predict where salient locations on the saliency map are likely to be. As implemented in the embodied Agent 1, these saliency maps are combined, to derive an aggregate measure of saliency.

In one embodiment the attention model implemented includes a plurality of saliency maps that represent different types of saliency objectives. The aggregate saliency map in the is a weighted sum of the maps used. How the various saliency maps are weighted may be altered. In one example the weights may be used as follows so that objects (things or people) increase in salience if both the User and the embodied Agent are focusing on the object.

$$\text{Salience\_gaze} = \text{weight}g_1 * \text{embededAgent\_gaze\_map} + \text{weight}g_2 * \text{User\_gaze\_map} + \text{weight}g_3 * (\text{embededAgent\_gaze\_map}.*\text{User\_gaze\_map})$$

$$\text{Salience\_point} = \text{weight}p_1 * \text{embededAgent\_point\_map} + \text{weight}p_2 * \text{User\_point\_map} + \text{weight}p_3 * (\text{embededAgent\_point\_map}.*\text{User\_point\_map})$$

The information used to create the salience maps includes the inputs discussed in the Conversational Interaction above. Non-visual inputs such as auditory and textual inputs may also be applied to saliency maps by mapping the inputs to a visual map space. For example to map a User pointing at an object the system can calculate the location the User is pointing at and maps that location to a visual map space. If the input is auditory the system calculates the location from which the sound came from and maps that location to a visual map space. These pointing and auditory maps are combined with the visual maps. In one embodiment the attention model includes sub maps (trackers) that enable the embodied Agent to keep track of objects that have previously been attended to, even if there has been a subsequent shift in the current attention.

Figure 21:
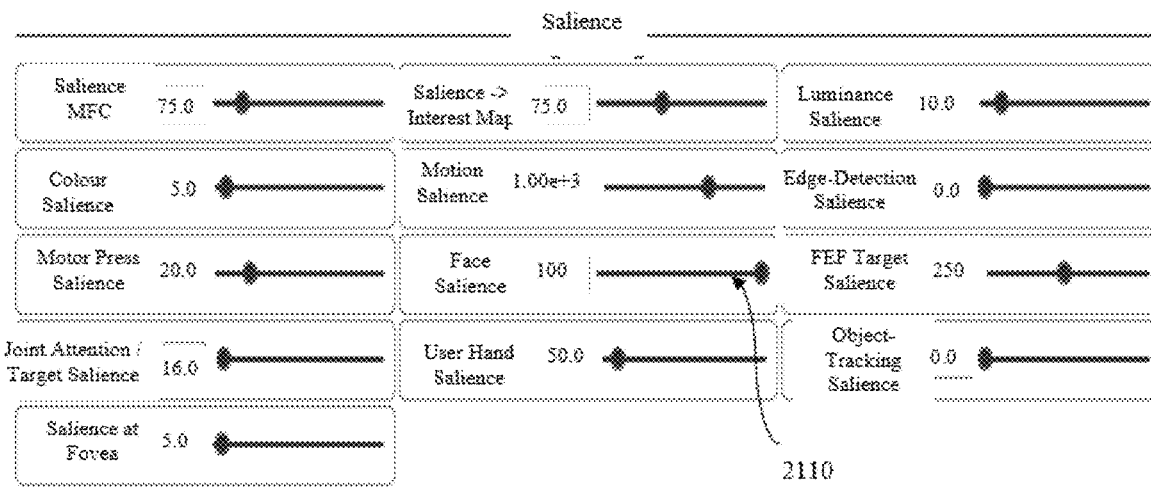
FIG. 21 shows a user interface for setting salience values.

FIG. 21 shows a screenshot of a user interface for setting a plurality of salience maps. The weighting of the maps can be changed using the sliders 2110 shown in FIG. 21. The sliders alter the default weightings.

In certain embodiments, a plurality of visual feeds from different sources may both activate visual feature maps, providing embodied Agents with representation of multiple visual feeds. Each field can be used to compute a saliency map that controls visuospatial attention. Each visual feed may be associated with a plurality of feature maps, highlighting areas of the visual feed as more salient with respect to other areas of the visual feed. For example, a camera visual feed (capturing a User 3 interacting with an embodied Agent 1) and a browser window visual feed (capturing a computer browser with which the User 3 and/or Agent 1 is interacting) both activate visual feature maps. Another visual feed may be provided by the Agent's own 3D virtual environment. For example, a 2D plane corresponding to the field of view the Agent 1 has of its surrounding environment may be provided to an Agent 1 by ray-casting from the perspective of an Agent.

A human-like model of attention may be implemented such that the Agent 1 is only able to focus on an aspect of one of the visual feeds at any given time. Thus, a single salient region across the two or more maps is ever selected for attention at one moment: when it comes to attentional switching, the two or more visual fields can be thought of as a single visual field with two parts. A weighting may be applied to visual feeds in their entirety, such that certain visual feeds are determined to be more salient than other visual feeds.

Saliency maps may be applied to verbal cues, to assist an Agent in locating items to which a User is referring to. For example, key words such as "left", "right", "up", "down", may be mapped to a "verbal cue" saliency map which highlights corresponding regions of a visual feed as salient. The verbal cue saliency map may be combined with other saliency maps as above to facilitate joint attention, and interaction. For example, if a User 3 says: "the button on your left", the verbal cue saliency map may highlight the left half of the screen. This may then be combined with an object saliency map which detects buttons, highlighting the button which is on the left as the most salient, and thus the button to which the Agent pays attention.

Figure 22:
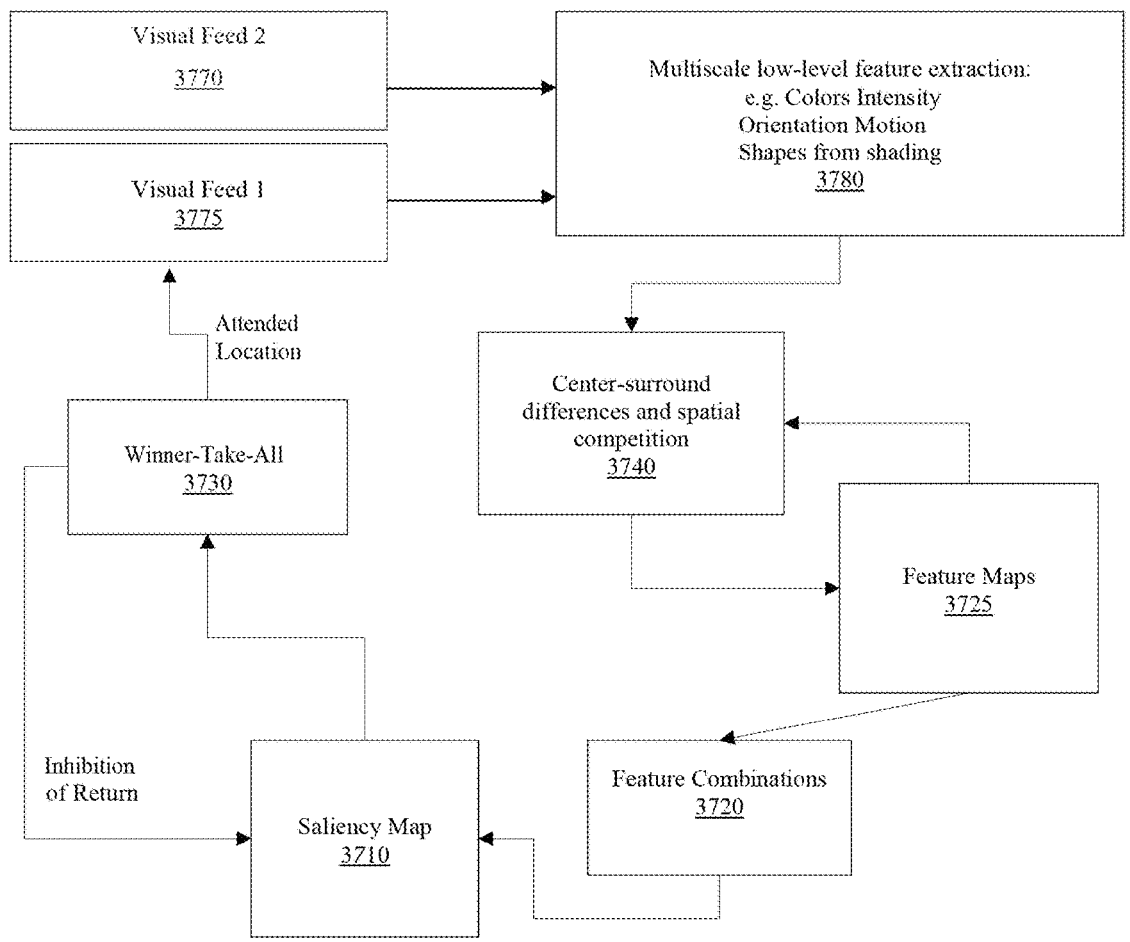
FIG. 22 shows an attention system for multiple visual feeds.

Referring to FIG. 22 a system implemented with multiple visual feeds is illustrated. The system extracts multiple low-level features 3780 from two visual streams 3770, 3775. Then a centre-surround filter 3740 is applied to each map, to derive feature-specific saliency maps. From these maps, feature maps 3725 are created and the combinations of maps are created for specific features 3720. For example, the User's face, or the User's surroundings. A combined saliency map 3710 is then created from the individual salience or feature maps. These feature-specific maps are combined in a weighted sum, to produce a feature-independent saliency map 3710. The system then applies 'winner take all' (WTA) operation, that selects the most active location in the saliency map 3710 as the region to attend to.

In addition to the camera feeds sound feeds or other feeds may be feed into the system to create the feature maps 3625, 3725. In one embodiment a turn taking feature map may be incorporated into the system with the such that the focus of the turn taking feature map depends on who turn it is. This turn taking map creates a bias in the saliency maps related to turn taking.

Examples of Interactions

Figure 12:
FIGS. 12 to 16 show screenshots of human computer interaction via an agent.

FIG. 12 shows a screenshot of an Agent facilitating User interaction with a webpage. The web page includes Shared Digital Content comprising several menu items, a search bar, and a navigational button. Relative to a user, the Agent 1 is positioned in front of the Shared Digital Content. The Agent 1 has a perceptual awareness of the Shared Digital Content 5. The Agent 1 can therefore refer or point to different content items as part of interacting with a User. The Agent 1 may engage with dialogue with the User 3 to ascertain what the User wishes to navigate to next. The Agent 1 may turn around to look at a digital content item which the User has indicated interest in, and trigger navigation to the URL which the menu content item links to. The Agent may point to a certain content item and visually press it, as if they are clicking on the item.

Figure 13:
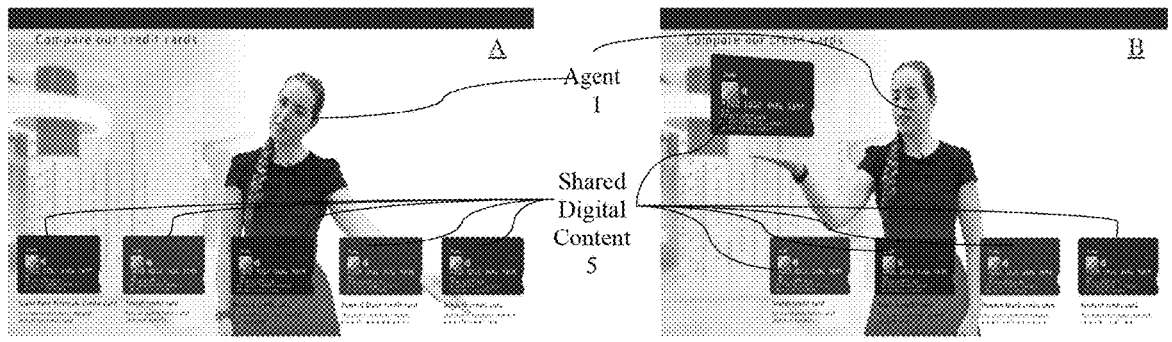

FIG. 13 shows screenshots of an Agent 1 located behind Shared Digital Content 5. The example shown is a bank's website showing several credit cards to choose from available to Users. The Agent 1 may be conversing with a User and ask if the User would like more information about any of the shown credit cards, which are Shared Digital Content 5. The User could directly click on one of the Shared Digital Content items (credit cards) as they are clickable HTML objects which trigger a link to further information. Alternatively, the User can ask the Agent 1 to provide further information about one of the credit cards. The Agent 1 has a perception of conceptual objects representing the Shared Digital Content 5 and can therefore ascertain which credit card the User is interested in, from the information provided to the Agent 1 via an Interaction Module. Instead of the User clicking a credit card, the Agent 1 can trigger an action on the conceptual object representing that credit card, which in turn is translated via the Interaction Module to a click of the item on the website. As the credit cards are clickable images, the Agent 1 may use pixel information from the image to ascertain the colour of the images and can therefore understand if the User 3 is referring to their item of interest by colour. FIG. 13B shows the webpage once a digital content item has been selected by a User. The Agent 1 can access meta data relating to the digital content item, for example through a digital content provider database, to tell the User more information about that content item. Additionally, such information may be displayed to the User (not shown) in the AVE.

Figure 14:

FIG. 14 shows an Agent 1 taking a User through an interactive menu (Shared Digital Content 5) to help the User find a suitable credit card. Again, the User can directly click on a menu item, or the User can converse with the Agent 1 and the Agent 1 can click on digital content items on behalf of the User. For example, the Agent 1 may ask the User "how often would you use your card?" The User can read one of the three displayed menu options: "All the time", "every now and then", or "I'm not sure". The Agent 1 will match the User 3's utterance to one of the digital content items, as the text on the digital content items, provided to the Agent 1 as an attribute of the corresponding conceptual object of the content item. The User might utter something slightly different from the predetermined text, such as "I don't know", instead of "I'm not sure", and the Agent 1 may infer the option which the User wishes to select. FIG. 14 shows the option "I'm not sure" already selected. The Agent 1 is in the process of a touch (corresponding to a mouse click) on the menu item reading "the full amount on my statement". The Agent 1 is looking directly at the digital content item which the agent is touching. The Agent 1 touching a contextual object triggers a click on the digital content item via the Interaction Module 16. The User may choose not to go through the menu sequentially but skip the first set of options, for example, to telling the Agent 1 that they want low fees. The Agent 1 may select that option, then ask the User about information from a previous step.

FIG. 15 shows a sequence of screenshots of an Agent 1 facilitating User interaction with the website to help the User purchase a car. Thus, the Agent 1 may walk up to the car and point to features of the car. If the car rotates or changes position, the Agent 1 can continue pointing to the same aspect of the car. FIG. 15A shows an Agent 1 walking onto the screen from the left. The website includes a top menu including a Digital Content 4 and a virtual showroom 1780 displaying a virtual car 1760. The virtual showroom is configured to display 3D models of purchasable items. The User 3 may not be able to interact with objects in the virtual showroom directly as this is in the Agent 1's virtual environment. Nonetheless the User 3 may indirectly interact with such objects by communicating with the Agent 1 such that the Agent 1 manipulates objects in the Agent 1's virtual environment. For example, the User 3 may ask the Agent 1 to pick up an item, manipulate an item, change the item's colour, or rotate an item so that the User 3 can see the item from another angle. FIG. 15B shows the Agent 1 facing towards the User 3, after having entered the virtual showroom, and engaging conversationally with a User 3 to find out what the User 3 is interested in. FIG. 15C shows the Agent 1 gesturing towards the virtual car 1750. As the Agent 1 has a perceptual awareness of where the car is in relation to the Agent 1 as well as the screen, the Agent 1 is able to gesture towards the virtual space coordinates of the car. As the Agent 1 is situated in a virtual environment include the D virtual car, the Agent 1 may walk towards the car and point to various features of the car (defined to the Agent 1 by object metadata, such as coordinates of features and tags). As both the Agent 1 and the car are in the same 3D virtual environment, movement of the Agent 1 towards the car appropriately decreases the "real world" size of the Agent 1 on the screen and adds realism to the interaction. FIG. 15E shows an Agent 1 having brought up a menu 2150 of options to ask the User 3 about the User 3's interest. FIG. 15F shows the Agent 1 selecting menu item on behalf of the User 3. The Agent 1 has touched the item, which triggers a click on the corresponding digital content item. FIG. 15F shows navigation to an image showing the interior of the car. The User's view is now from the perspective of the Agent 1, and the Agent 1's hand is visible.

Figure 16:
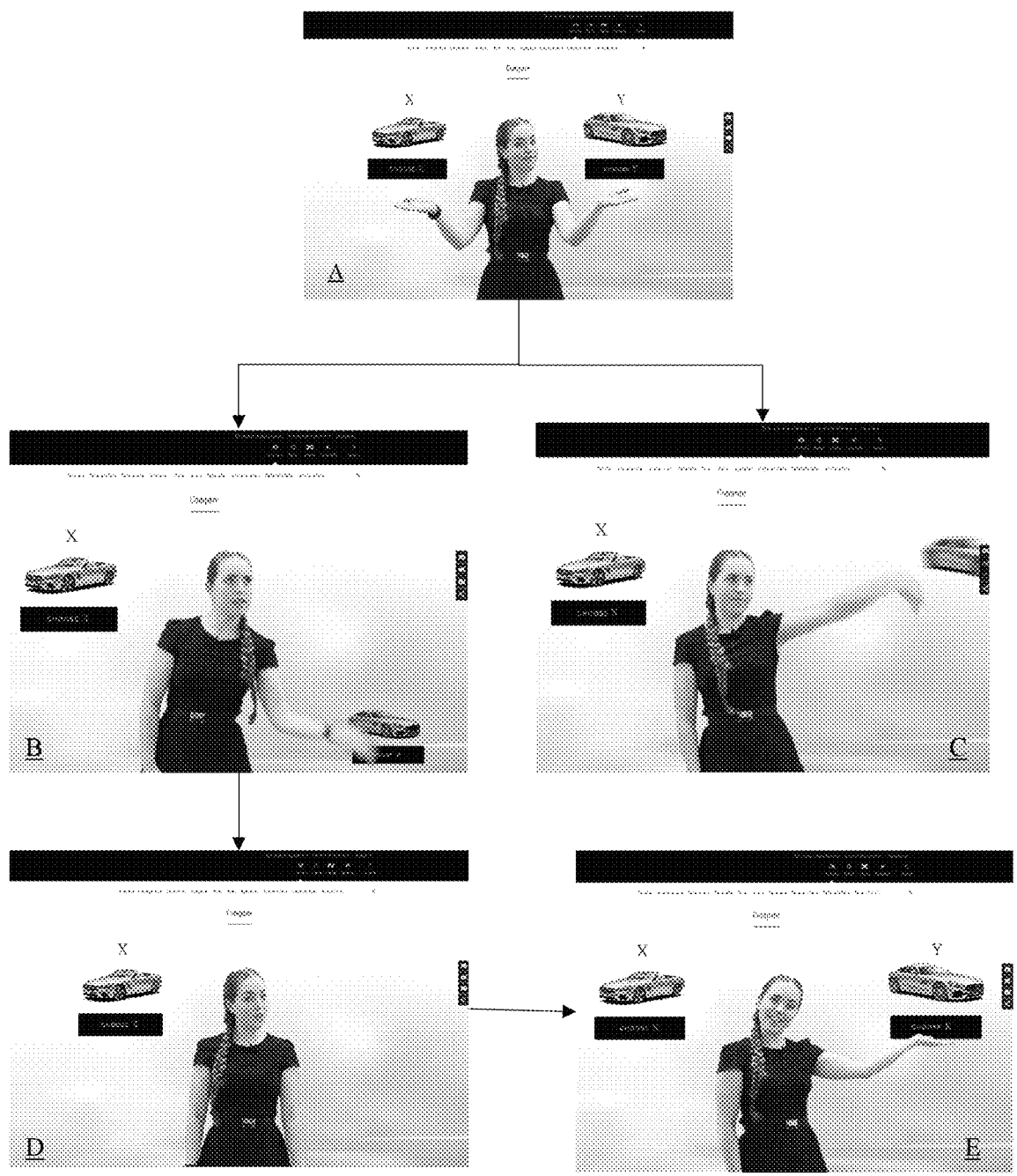

FIG. 16 shows sequences of non-linear interaction dependent upon User feedback. FIG. 16A shows the Agent 1 displaying two purchase choices X and Y to a User. On the other hand, FIG. 16B shows an Agent 1 gently/tentatively placing option Y aside, after receiving feedback from the User that implies the User has a preference for the other option Y, however is not 100% sure. After receiving feedback from the User that option Y is categorically not wanted by the User, FIG. 16C shows the Agent 1 may remove the option by throwing it aside. FIG. 16D shows the Agent 1 with an anticipatory expression whilst the Agent 1 waits for a User to make up his mind on whether they wish to return item Y into consideration. FIG. 16E shows the Agent 1 returning item Y to the screen.

Agent may assist a User in learning how to do a certain task using third party software. For example, in an application such as photoshop, the Agent may converse with a User and show how to navigate the application's interface by physically interacting with controllable digital content items on the interface. A general algorithm may be provided to an Agent with steps of how to operate or navigate a User Interface. The Agent may include a knowledge library of tasks, each associated with a temporal sequence of actions, which may be defined by finding a salient item (e.g. a symbol or text), performing an action on that item (e.g. clicking), then proceeding to the next step. The Agent may take control of a human input device (e.g. mouse/touch input) to perform those steps when asked by a User to perform an action which is stored in the Agent's library of knowledge on UI interaction tasks.

The Agent may assist a User in making a purchase choice for online shopping. The Agent may be embedded in an e-commerce platform and help guide the User through items. In one embodiment the Agent may receive information about a User's profile to guide interaction. For example, a User may have a profile created from a history of engagement with an ecommerce system (e.g. prior purchases). The User's profile stored in a broader recommender system, and the Agent may use the recommender system to appropriately recommend items to a User. The Agent may purchase a product on behalf of a User by navigating the e-commerce UI for the user. Accidental or unintentional purchases may be minimised by the Agent looking at the User's body language whilst verbally confirming to proceed with the purchase. For example, if the Agent sees the User nodding whilst saying "yes, please buy it", and looking at the product in question, the Agent can be confident in its understanding of the User's desire and proceed to purchase the item.

The Agent may include a computer program that is configured to perform tasks, or services, for a User of end user computing device (a personal assistant). Examples of tasks that may be performed by the Agent on behalf of the User may include, placing a phone call to a user-specified person, launching a User-specified application, sending a user-specified e-mail or text message to a user-specified recipient, playing user-specified music, scheduling a meeting or other event on a user calendar, obtaining directions to a user-specified location, obtaining a score associated with a user-specified sporting event, posting user-specified content to a social media web site or microblogging service, recording user-specified reminders or notes, obtaining a weather report, obtaining the current time, setting an alarm at a user-specified time, obtaining a stock price for a user-specified company, finding a nearby commercial establishment, performing an Internet search, or the like.

In one embodiment, the Agent may play with or collaborate with the User on an activity. For example, the Agent and User may collaborate together on a drawing. The drawing itself may be on the shared environment. If the User draws an object such as an apple on the shared space, the Agent may recognize the object as an apple and talk about the apple. Or it may add a drawing lines or visual features to the apple, such as colour it in red. In another embodiment, the Agent and the User may interact on a shared environment to collaborate on some other activity such as playing music. The shared environment may include a virtual musical instrument, such a xylophone. The User may strike xylophone keys, and the Agent may react to this accordingly. The Agent may notice items moving on its shared space, recognize and react objects on the shared space.

Navigating the internet, an application, an operating system, or any other computer system, may be co-driven by the Agent and a User. Users accessing the web can be searching or browsing (looking for something new or interesting). An Agent 1 may facilitate web browsing and transform web-browsing into a real time activity rather than query-based retrieval. In one embodiment, the Agent assists the User with web search using an interactive dialogue. The Agent may use another search tool "in the back end", which is not displayed to a user as are the results of traditional search engines (such as Google). In traditional recommendation systems, a user must perform a mental "context switch" from browsing the space of web pages to explicitly interacting with a search assistant. An embodied Agent as described herein enables the flow of thought of the User's browsing activity to not be interrupted by the need to switch to an independent query interface. The Agent's recommendations are in real-time as related pages arise in the User's browsing activity, since the Agent is constantly watching the browsing activity. An Agent may show a User how to navigate or perform an action on an internet web page. The Agent may be able to "preview" a link or chain which is not displayed to a User, and thus warn Users about links which are "dead ends" (links that looks like they might be interesting from reading the link text or seeing a link image, but turn out not to be), or garden path is a sequence of links that provide just enough incentive to keep following the path, but ultimately results in a dead end. In one embodiment the Agent 1 may be provided with a syntactic understanding of general web languages, and may assist a User in the User's search for online information. The User may ask the Agent to scroll up or down, click on a particular search link, enter a URL in the browser, go back to the previous page or navigate in some other way The Agent may help a User fill out a form. If an Agent has a profile of the User, the Agent may automatically fill out the details about the User that the Agent knows. The Agent may ask the User about a field the Agent is not sure about. In the case that a form is not successfully entered (for example, the User has missed a constraint on a password), the Agent may identify the constraint that was violated from the error message, and ask a User to rectify it. The Agent may automatically navigate to and/or gesture toward the field which needs to be re-entered.

A Shared Environment may be used as a canvas for tutoring of the User 3 by the Agent 1. For example, the Agent 1 may ask the User 3 to solve a mathematical equation on the shared environment and show all working. The Agent 1 may perceive the numbers and steps that the User writes, using character recognition. The Agent 1 may engage with dialogue and interact with the User about the work on the shared canvas, such as by referring to different lines of the working, erasing or underline mistakes, or adding further working to the shared canvas. In practical subjects, the Agent can assist a User's learning in a virtual or augmented reality context. For example, to facilitate medical training, an Agent 1 can use a tool in front of someone, pass it to them and let them try for themselves.

Advantages

Early work in human computer interaction highlighted the advantage of interacting with "model worlds"; computational device interfaces within which objects and actions resemble/mirror objects and actions in the real world which is more intuitive to human Users. The traditional application of artificial Agents to user-interfaces resulted in "magic worlds" where the world changes due to the workings of hidden hands. Embodiments described herein extend human computer interaction and artificial intelligence by enabling interfaces where the world changes due to visible helpful hands, as well as visually displaying in an efficient manner information about the input received by Agents (via the Agent's gaze direction/eye-direction/body-language) and the mental state of Agents. Instead of a User seeing interface elements "move by themselves", the User can now visualize the Agent's thought processes and actions leading to the interface manipulation. The User can directly observe autonomous actions of the Agent and the Agent can observe actions taken autonomously by the User in the interface.

Embodied Agents operating directly in the User interface rather than as a "background" or "back-end" increases the extent to which Users will perceive the software as acting like an assistant. If the User perceives the Agent's actions as actions "that I could have done myself", the User is more willing to conceptualize the Agent in the role of an assistant.

In a traditional command-line or menu-driven interface, the User performs input, enters it, the system accepts the input, computes some action, displays the result, and waits for the next input. The system is doing nothing while the User is preparing the input, and the User is doing nothing in the interface while the system is running Embodiments described herein provide an Agent which can run independently and concurrently.

The methods described herein assist Users in performing the task of operating a computing device by means of a continued and/or guided human-machine interaction process. Restricting the capabilities of the autonomous Agent to actions which may be emulated through traditional input devices or methods may facilitate the Agent guiding a User, as the Agent is not able to take shortcuts.

Embodiments of the invention can usefully translate between legacy application programs (written to communicate with now generally obsolete input/output devices and User interfaces) and user-interfaces comprising an embodied autonomous Agent as described herein, so that the logic and data associated with the legacy programs can continue to be used in a novel interaction context.

Embodiments described herein avoid the need for synchronization between pre-recorded or predefined animations and/or dialogue and run-time generated desired behaviours in outputs. Thus, fixed length verbal and/or nonverbal segments need not be mapped to run-time situations and synchronized spatially or temporally to fit variable and/or dynamic digital content. There is no need to synchronize verbal and nonverbal behaviour as an agent simulation including a neurobehavioural model drives both.

Embodiments described with reference to Agent perception via computer vision may leverage techniques in DOM parsing, computer vision and/or natural language processing to simulate the human processing that occurs when viewing digital content to automatically extract useful information and interact with the digital content. Agents are able to send messages or requests to the Interaction Module which embodies actions relevant to and compatible with the object being manipulated. These actions allow the Agent to control and interact with browser hosted content of all types in an abstracted way. Accordingly, user-machine interaction is modelled in such a way that it is possible to keep separate dialogue knowledge from application knowledge. This opportunity dramatically reduces the cost of moving an interaction system from an application domain to a new application domain. Real-time performance & timing control of UI interaction is enabled by the strict temporal model of the Agent and architecture. The real-time response of Agents to User inputs to keep the latency of each part of the system at a minimum during on-time execution of actions.

An advantage to allowing Agents to interact with items within a simulated environment is that this creates a more natural looking interaction and brings Agent 1s to life in the eyes of a User. For example, content items which an Agent interacts with may be simulated to have mass and other physical properties. Elements provided by a digital content provider are still rendered natively as defined by the digital content provider.

Providing conceptual objects with affordances allows Agents to perceive actions available to the Agent, without needing to undertake significant cognitive processing/image recognition/reasoning, therefore reducing computational processing power and/or time. The advantages of using a Interaction Module is that it allows scalable customization of agent-facilitated interaction in different contexts or environments and enables the computer interfaces to accommodate technology of increased complexity.

INTERPRETATION

The methods and systems described may be utilised on any suitable electronic computing system. According to the embodiments described below, an electronic computing system utilises the methodology of the invention using various modules and engines.

The electronic computing system may include at least one processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the electronic computing system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The electronic computing system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general-purpose computing system specifically programmed to perform the described steps. Alternatively, the methods described herein may be implemented using a specific electronic computer system such as a data sorting and visualisation computer, a database query computer, a graphical analysis computer, a data analysis computer, a manufacturing data analysis computer, a business intelligence computer, an artificial intelligence computer system etc., where the computer has been specifically adapted to perform the described steps on specific data captured from an environment associated with a particular field.

Providing conceptual objects with affordances allows Agents to perceive actions available to the Agent, without needing to undertake significant cognitive processing/image recognition/reasoning.

The advantages using a Interaction Module 16 is that it allows scalable customization of agent-facilitated interaction in different contexts or environments and enables the computer interfaces to accommodate technology of increased complexity.

SUMMARY

In one aspect, there is provided a method for visualising an interaction between an embodied artificial agent and digital content on an end user display device of an electronic computing device the method comprising the steps of: creating an agent virtual environment, having virtual environment coordinates; simulating the digital content in the agent virtual environment; simulating the embodied artificial agent in the agent virtual environment; enabling the embodied artificial agent to interact with the simulated digital content; and displaying on the end user display device the interaction between the embodied artificial agent and the digital content.

In one embodiment, the virtual environment is a 3D virtual space, and the virtual environment coordinates are 3D coordinates. Optionally, the interaction is moving towards the digital content item or looking at the digital content item. Optionally, the interaction is gesturing towards a digital content item or touching the digital content item by moving a multi joint effector. Optionally, movement of the multi joint effector is simulated using inverse kinematics. Optionally, movement of the multi joint effector is simulated using a neural network based mapping of joint positions to target positions.

In another aspect, there is provided a method for interacting with digital content on an electronic computing device via an embodied artificial agent the method comprising the steps of: displaying the digital content to a user on a user interface on the electronic computing device; creating an agent virtual environment, having virtual environment coordinates; simulating the digital content in the agent virtual environment; simulating the embodied artificial agent in the agent virtual environment; enabling the embodied artificial agent to interact with the simulated digital content; translating the interaction into an actuation or manipulation of the digital content on the user interface; and displaying the interaction by overlaying the embodied artificial agent over the digital content and displaying the digital content and overlaid embodied artificial agent on the user interface.

Optionally, the virtual environment is a 3D virtual space, and the virtual environment coordinates are 3D coordinates. Optionally, the digital content is simulated in the agent virtual environment as a pixel in the agent virtual environment, each pixel having a coordinate location in the agent virtual environment. Optionally, the simulated embodied interaction is an intersection between the coordinates of a pixel corresponding to digital content and a body of the agent. Optionally, translating the simulated embodied interaction includes mapping the embodied interaction to a input device event. Optionally, the human input device event is a mouse event, keyboard event or touchscreen event.

In another aspect, there is provided a system for facilitating interaction with an electronic computing device, the system including: at least one processor device; at least one memory device in communication with the at least one processor; an agent simulator module executable by the processor arranged to simulate an embodied agent; an interaction module executable by the processor arranged to translate digital content into conceptual objects perceivable by the embodied agent and enable the embodied agent to interact with the digital content; a rendering module executable by the processor arranged to render the digital content, the embodied agent and the interaction of the embodied agent with the digital content.

Optionally, the interaction module is further arranged to translate embodied agent actions on the conceptual object into changes to the digital content. Optionally, the interaction module associates conceptual objects with coordinates representing a location of the conceptual objects relative to the embodied agent. Optionally, the interaction module associates conceptual objects with one or more affordances of the corresponding digital content. Optionally, the computing device is a web content and the interaction module a JavaScript code integrated into the web content. In another aspect, there is provided an embodied agent situated in a virtual environment created on an electronic computing device, the embodied agent programmed to: receive input from a real world environment; receive input from the virtual environment; and behave dependent on the input from the real world environment and the virtual environment, wherein the received input from the real world environment and the virtual environment is received via continuous feedback loops from both the real world environment and the virtual environment.

In another aspect, there is provided a embodied agent simulator for simulating interaction with a user implemented on an electronic computing device, programmed to: receive user input; receive digital content inputs including information about digital content displayed to the user; and simulate a conversation with a user by generating responses to the user based on both natural language declarations of the user and the digital content inputs.

Optionally, the response to the user and/or the inputs are verbal. Optionally, the verbal responses and/or inputs are auditory or textual. Optionally, the response to the user and/or the inputs are visual. Optionally, the verbal responses and/or inputs are gestures or facial expressions.

In another aspect, there is provided a method for facilitating user interaction with an electronic computing device having a display and input means, at least one processor and memory for storing instructions, the processor programmed to: define a virtual environment having virtual environment coordinates; dimensioning the coordinates relative to a real-world physical dimensions of a display; simulate an embodied agent in the virtual environment, the position of the agent relative to the virtual space is defined by virtual environment coordinates; simulate one or more digital objects in the agent's virtual environment, the position of the one or more digital objects relative to the virtual environment is defined by virtual environment coordinates; enable the embodied agent to interact with the one or more digital objects using information about the virtual environment coordinates of the agent and the virtual environment coordinates of the virtual object; and displaying the interaction between the agent and the one or more digital objects to a user on the display.

In another aspect, there is provided a method for providing an embodied agent having a simulation environment with substantially real-time perception of continuous visual input from outside the simulation environment, the method comprising the steps of: providing an interface between a programmatic definition of the embodied agent and/or simulation environment and the continuous visual input; capturing visual input from outside the simulation environment at every time-step of the agent's simulation and at each time-step transferring the input data to the embodied agent and/or simulation environment; and inputting visual input into a visual system of the agent or simulating the visual input within the agent's simulation environment.

In another aspect, there is provided a method for enabling an artificial agent to interact with a user interface including the steps of representing digital content displayable to a user via an end user display to the artificial agent; translating the artificial agent's cognitive decision and/or physical movements into an actuation or manipulation of a human input device controlling the user interface.

Optionally, translating the simulated embodied interaction includes mapping an embodied interaction between the artificial agent and digital content to an input device event. Optionally, the human input device event is a mouse event, keyboard event or touchscreen event.

In another aspect, there is provided a method for interacting with an artificial agent, the method including: simulating the artificial agent in an agent virtual space, representing digital content to be perceivable by the artificial agent by simulating the digital content in the agent virtual space; displaying the artificial agent artificial agent virtual space and digital content to a user on a display; receiving images of the user from a camera; tracking the gaze of the user on the display based on the received images; and simulating embodied interaction between the artificial agent, the user and the digital content based on user inputs including at least the gaze of the user.

Optionally, the users gaze is tracked using the users eye angle and/or the users head angle. Optionally, further including tracking the user's eye movement and wherein the simulated embodied interaction is further based on the user's eye movement.

Optionally, the users eye movement is tracked using the users eye angle and/or the users head angle. Optionally, the user inputs include verbal inputs. Optionally, the user inputs include auditory or textual inputs. Optionally, the user inputs include touch screen or mouse movements. Optionally, the user inputs include visual inputs. Optionally, the visual inputs are gestures or facial expressions. Optionally, the gestures include movement of one or more of the arm, hand or finger. Optionally, the simulated embodied interaction between the artificial agent, the user and the digital content based includes the user directing attention to an object in the digital content of the agent virtual space.

Optionally, the method includes tracking the gaze of the artificial agent and wherein the simulating embodied interaction is further based on a dyadic turn taking model applied to the user's and artificial agent's gaze. Optionally, the artificial agent indicates the end of their turn during an interaction by attempting a direct gaze with the user. Optionally, the artificial agent perceives that the user indicates the end of their turn when the user initiates a direct gaze with the artificial agent. Optionally, the interaction occurs in a virtual reality environment. Optionally, the interaction occurs in an augmented reality environment.

In another aspect, there is provided an embodied agent simulator for simulating interaction with a user implemented on an electronic computing device, the embodied agent simulator programmed to: simulating the artificial agent in an agent virtual space, representing digital content to be perceivable by the artificial agent by simulating the digital content in the agent virtual space; displaying the artificial agent, artificial agent virtual space and digital content to a user on a display; receiving images of the user from a camera; tracking the gaze of the user on the display based on the received images; and simulating embodied interaction between the artificial agent, the user and the digital content based on user inputs including at least the gaze of the user.

Optionally, the user's gaze is tracked using the users eye angle and/or the users head angle. Optionally, further including tracking the user's eye movement and wherein the simulated embodied interaction is further based on the user's eye movement. Optionally the users eye movement is tracked using the users eye angle and/or the users head angle. Optionally, the user inputs include verbal inputs. Optionally, the user inputs include auditory or textual inputs. Optionally, the user inputs include touch screen or mouse movements. Optionally, the user inputs include visual inputs. Optionally, the visual inputs are gestures or facial expressions. Optionally, the gestures include movement of one or more of the arm, hand or finger. Optionally, the simulated embodied interaction between the artificial agent, the user and the digital content based includes the user directing attention to an object in the digital content of the agent virtual space. Optionally, the method includes tracking the gaze of the artificial agent and wherein the simulating embodied interaction is further based on a dyadic turn taking model applied to the user's and artificial agent's gaze. Optionally, the artificial agent indicates the end of their turn during an interaction by attempting a direct gaze with the user. Optionally, the artificial agent perceives that the user indicates the end of their turn when the user initiates a direct gaze with the artificial agent. Optionally, the interaction occurs in a virtual reality environment. Optionally, the interaction occurs in an augmented reality environment.

In another aspect, there is provided a method for interacting with an artificial agent, the method including: simulating the artificial agent in an agent virtual space, representing digital content to be perceivable by the artificial agent by simulating the digital content in the agent virtual space; displaying the artificial agent, artificial agent virtual space and digital content to a user on a display; receiving images of the user and user's environment from a camera; tracking the gaze of the user based on the received images; and simulating embodied interaction between the artificial agent, the user, the user's environment and the digital content based on user inputs including at least the gaze of the user.

Optionally, the users gaze is tracked using the users eye angle and/or the users head angle. Optionally, further including tracking the user's eye movement and wherein the simulated embodied interaction is further based on the user's eye movement. Optionally, the users eye movement is tracked using the users eye angle and/or the users head angle. Optionally, the user inputs include verbal inputs. Optionally, the user inputs include auditory or textual inputs. Optionally, the user inputs include touch screen or mouse movements. Optionally, the user inputs include visual inputs. Optionally, the visual inputs are gestures or facial expressions. Optionally, the gestures include movement of one or more of the arm, hand or finger. Optionally, the simulated embodied interaction between the artificial agent, the user, the user's environment and the digital content includes the user directing attention to an object in the digital content of the agent virtual space or an object in the user's environment. Optionally, the method includes tracking the gaze of the artificial agent and wherein the simulating embodied interaction is further based on a dyadic turn taking model applied to the user's and artificial agent's gaze. Optionally, the artificial agent indicates the end of their turn during an interaction by attempting a direct gaze with the user. Optionally, the artificial agent perceives that the user indicates the end of their turn when the user initiates a direct gaze with the artificial agent. Optionally, the interaction occurs in a virtual reality environment. Optionally, the interaction occurs in an augmented reality environment.

A embodied agent simulator for interacting with an artificial agent, the method including: simulating the artificial agent in an agent virtual space, representing digital content to be perceivable by the artificial agent by simulating the digital content in the agent virtual space; displaying the artificial agent, artificial agent virtual space and digital content to a user on a display; receiving images of the user and user's environment from a camera; tracking the gaze of the user based on the received images; and simulating embodied interaction between the artificial agent, the user, the user's environment and the digital content based on user inputs including at least the gaze of the user.

In another aspect: A method implemented system for interacting with an artificial agent, the method including: simulating the artificial agent in an agent virtual space, displaying the artificial agent and the artificial agent virtual space to a user on a display; receiving images of the user from a camera; tracking the user's attention; applying an attention model to the user's attention and providing an output to the artificial agent; and simulating embodied interaction between the artificial agent and the user based on the output of the attention model.

In another aspect: An embodied agent simulator for simulating interaction with a user implemented on an electronic computing device, the embodied agent simulator programmed to: simulate the embodied agent in an agent virtual space, displaying the artificial agent and embodied agent virtual space to a user on a display; receiving images of the user from a camera; tracking the users attention based on the received images; applying an attention model to the user's attention and providing an output to the embodied agent; and simulating embodied interaction between the embodied agent and the user based on the output of the attention model.

Optionally, the attention model is also applied to the artificial agent's attention. Optionally, the method includes receiving images of the user's space from the camera. Optionally, the method includes representing digital content to be perceivable by the artificial agent by simulating the digital content in the agent virtual space, the digital content being visible to the user. Optionally tracking the users attention includes tracking the gaze of the user. Optionally, tracking the user's attention includes tracking the eye movement of the user. Optionally, tracking the user's attention includes tracking the eye movement of the user on the display. Optionally, the method includes tracking the gaze of the artificial agent and wherein the attention model is also applied to the gaze of the artificial agent. Optionally, the attention model includes a salience factor and objects that are jointly attended by the artificial agent and the user increase in salience. Optionally objects are people and/or things. Optionally, the salience factor includes a weighted salience gaze factor based on the users and the artificial agent's salience gaze map. Optionally, the weighted salience gaze factor is calculated as a first weighting times the artificial agent's gaze map plus a second weighting times the user gaze map plus a third weighting times the artificial agent's gaze map times the user gaze map. Optionally, the salience factor includes a weighted salience point factor based on the users and the artificial agent's salience point map. Optionally, the weighted salience point map factor is calculated as a first weighting times the artificial agent's point map plus a second weighting times the user point map plus a third weighting times the artificial agent's point map times the user point map. Optionally, the attention model is also applied to the user's eye movement, actions of the user, objects in the user's environment and actions in the user's environment. Optionally, the objects are people and/or things. Optionally, the attention model is also applied to user inputs. Optionally, user inputs include auditory or textual inputs. Optionally, inputs include verbal inputs. Optionally, the user inputs include touch screen or user mouse movements. Optionally, the user inputs include visual inputs. Optionally, the visual inputs are gestures or facial expressions. Optionally, the gestures include movement of one of the arm, hand or finger. Optionally, the attention model is also applied to the artificial agent's actions and actions in the artificial agent's background. Optionally, the user's eye movement and gaze are tracked using the users eye angle and/or the users head angle. Optionally, the simulated embodied interaction between the artificial agent, the user and the digital content includes the user directing attention to an object in the digital content of the agent virtual space. Optionally, the method includes tracking the gaze of the artificial agent and wherein the simulating embodied interaction is further based on a dyadic turn taking model applied to the user's and artificial agent's gaze. Optionally, the artificial agent indicates the end of their turn during an interaction by attempting a direct gaze with the user. Optionally, the artificial agent indicates the end of their turn during an interaction by verbal cues. Optionally, the artificial agent indicates the end of their turn during an interaction by non-verbal cues. Optionally, the non-verbal cues include smiles, winking, movement of the head, movement of the body including arms, hands and fingers. Optionally, the artificial agent perceives that the users indicating the end of their turn during an interaction when the user initiates a direct gaze with the artificial agent. Optionally, the artificial agent perceives that the users indicating the end of their turn when the user uses verbal cues. Optionally, the artificial agent perceives that the users indicating the end of their turn when the user uses non-verbal cues. Optionally, the non-verbal cues include smiles, winking, movement of the head, movement of the body including arms, hands and fingers. Optionally, interaction occurs in a virtual reality environment and/or augmented reality environment. Optionally, the artificial agent is not visible on the display during at least part of the interaction.

The invention claimed is:

1. A method for visualising an interaction between an embodied artificial agent and digital content on an end user display device of an electronic computing device the method comprising the steps of:
    creating an agent virtual environment, having virtual environment coordinates;
    simulating the digital content in the agent virtual environment;
    simulating the embodied artificial agent in the agent virtual environment;
    enabling the embodied artificial agent to interact with the simulated digital content; and
    triggering display on the end user display device the interaction between the embodied artificial agent and the digital content,
    wherein when the end user makes a change to the digital content via a user interface, reflecting the change in the simulated digital content in the agent virtual environment.

2. The method of claim 1 wherein the virtual environment is a 3D virtual space, and the virtual environment coordinates are 3D coordinates.

3. The method of claim 2 wherein the interaction is one or more of the group comprising: moving towards the digital content, looking at the digital content, gesturing towards a digital content, or touching the digital content item by moving a multi joint effector.

4. The method of claim 3 wherein digital content is simulated on a plane within the agent virtual environment.

5. A method for interacting with digital content on an electronic computing device via an embodied artificial agent the method comprising the steps of:
    triggering display of the digital content to a user on a user interface on the electronic computing device;
    creating an agent virtual environment, having virtual environment coordinates;
    simulating the digital content in the agent virtual environment;
    simulating the embodied artificial agent in the agent virtual environment;
    enabling the embodied artificial agent to interact with the simulated digital content;

translating the interaction into an actuation or manipulation of the digital content and triggering actuation or manipulation of the digital content on the user interface; and triggering display of the interaction by overlaying, underlaying, and/or blending the embodied artificial agent with digital content on the user interface, wherein when the end user makes a change to the digital content via a user interface, reflecting the change in the simulated digital content in the agent virtual environment.

6. The method of claim 5 wherein the digital content is simulated in the agent virtual environment as a pixel in the agent virtual environment, each pixel having a coordinate location in the agent virtual environment.

7. The method of claim 6 wherein the interaction is an intersection between the coordinates of a pixel corresponding to digital content and a body of the agent.

8. The method of claim 7 wherein translating the simulated embodied interaction includes mapping the embodied interaction to a human input device event.

9. The method of claim 8 wherein the human input device event is one or more of the group comprising: a mouse event, keyboard event or touchscreen event.

10. A system for facilitating interaction with an electronic computing device, the system including:
at least one processor device;
at least one memory device in communication with the at least one processor;
an agent simulator module executable by the processor arranged to simulate an embodied agent in an agent virtual environment;
an interaction module executable by the processor arranged to simulate an embodied agent; an interaction module executable by the processor arranged to translate digital content into conceptual objects perceivable by the embodied agent and enable the embodied agent to interact with the digital content;
a rendering module executable by the processor arranged to render the digital content, the embodied agent and the interaction of the embodied agent with the digital content;
a user interface,
wherein when the end user makes a change to the digital content via a user interface, reflecting the change in the simulated digital content in the agent virtual environment.

11. The system of claim 10 wherein the interaction module is further arranged to translate embodied agent actions on the conceptual object into changes to the digital content.

12. The system of claim 11 wherein the interaction module associates conceptual objects with coordinates representing a location of the conceptual objects relative to the embodied agent.

13. The system of claim 10 wherein the interaction module associates conceptual objects with one or more affordances of the corresponding digital content.

14. The system of claim 13 wherein the computing device provides a web content and the interaction module is a JavaScript code integrated into the web content.

15. The method of claim 1, wherein the embodied artificial agent operates autonomously.

16. The method of claim 5, wherein the embodied artificial agent operates autonomously.

17. The system of claim 10, wherein the embodied agent operates autonomously.

* * * * *